United States Patent
Yaoyama

(10) Patent No.: US 8,548,634 B2
(45) Date of Patent: Oct. 1, 2013

(54) INFORMATION PROCESSING DEVICE AND NETWORK SYSTEM

(75) Inventor: Takahiro Yaoyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 280 days.

(21) Appl. No.: 13/029,182

(22) Filed: Feb. 17, 2011

(65) Prior Publication Data
US 2011/0231026 A1    Sep. 22, 2011

(30) Foreign Application Priority Data
Mar. 18, 2010  (JP) ................................. 2010-062067

(51) Int. Cl.
G05D 11/00    (2006.01)

(52) U.S. Cl.
USPC ............................. 700/291; 370/311; 713/300

(58) Field of Classification Search
USPC ........................... 700/291; 370/311; 713/300
See application file for complete search history.

(56) References Cited

U.S. PATENT DOCUMENTS

| | | | |
|---|---|---|---|
| 2002/0140964 A1 | 10/2002 | Goto et al. | |
| 2004/0047324 A1* | 3/2004 | Diener | 370/338 |
| 2006/0267769 A1* | 11/2006 | Ito et al. | 340/572.1 |
| 2007/0288774 A1* | 12/2007 | Tanaka | 713/300 |
| 2008/0271035 A1* | 10/2008 | Yasukawa | 718/104 |
| 2008/0313477 A1* | 12/2008 | Numano | 713/321 |
| 2009/0077399 A1 | 3/2009 | Noda et al. | |
| 2009/0086662 A1* | 4/2009 | Okada | 370/311 |
| 2009/0204011 A1* | 8/2009 | Suzuki | 600/500 |
| 2009/0216910 A1* | 8/2009 | Duchesneau | 709/250 |
| 2009/0249099 A1* | 10/2009 | Saito | 713/323 |
| 2009/0293006 A1* | 11/2009 | Sunagawa | 715/764 |
| 2010/0164710 A1* | 7/2010 | Chung et al. | 340/539.1 |
| 2011/0051789 A1* | 3/2011 | Kuroiwa et al. | 375/224 |
| 2012/0092130 A1* | 4/2012 | Chung et al. | 340/10.1 |

FOREIGN PATENT DOCUMENTS

| | | |
|---|---|---|
| CN | 101387855 A | 3/2009 |
| JP | 2002-142385 | 5/2002 |
| JP | 2002-292977 | 10/2002 |
| JP | 2003-162397 | 6/2003 |
| JP | 2006-133881 | 5/2006 |
| JP | 2008-287492 | 11/2008 |

OTHER PUBLICATIONS

Chinese Office Action dated Apr. 3, 2013.
Japanese Office Action dated Jul. 23, 2013.

* cited by examiner

*Primary Examiner* — Mohammad Ali
*Assistant Examiner* — Anthony Whittington
(74) *Attorney, Agent, or Firm* — IPUSA, PLLC

(57) ABSTRACT

In an information processing device, an operation executing unit executes a requested operation in one of a plurality of operating modes. A monitoring unit monitors an electric power consumed by the execution of the requested operation. Information related to the consumed electric power is stored in a memory unit. A setting unit defines a consumption period and an allowable consumed electric power within the consumption period. A control unit computes a consumed-electric-power log of the consumed electric power monitored at intervals of a predetermined time and a consumed-electric-power total log, and stores consumed-electric-power log related information in the memory unit. When an operation request is received within the consumption period, the control unit controls the execution of the requested operation based on the consumed-electric-power log related information and the allowable consumed electric power.

13 Claims, 24 Drawing Sheets

FIG.16

| ALTERNATIVE NETWORK DEVICE | POWER CONSUMPTION | COST | FUNCTION | PERFORMANCE |
|---|---|---|---|---|
| MFP (5 PRINT SHEETS; 10 COPIES) | 1500W | 400 YEN | PRINT | 25ppm |
| MFP HIGH-SPEED (5 PRINT SHEETS; 10 COPIES) | 2500W | 450 YEN | PRINT | 50ppm |
| PERSONAL PRINTER (5 PRINT SHEETS; 10 COPIES) | 700W | 250 YEN | PRINT | 5ppm |
| NETWORK SCANNER (SENT TO 10 PERSONS) | 500W | 0 YEN | SCAN | — |
| ELECTRONIC COPYBOARD (30 MINUTES) | 800W | 0 YEN | DISPLAY | — |
| PROJECTOR (30 MINUTES) | 1200W | 0 YEN | DISPLAY | — |

Tb11

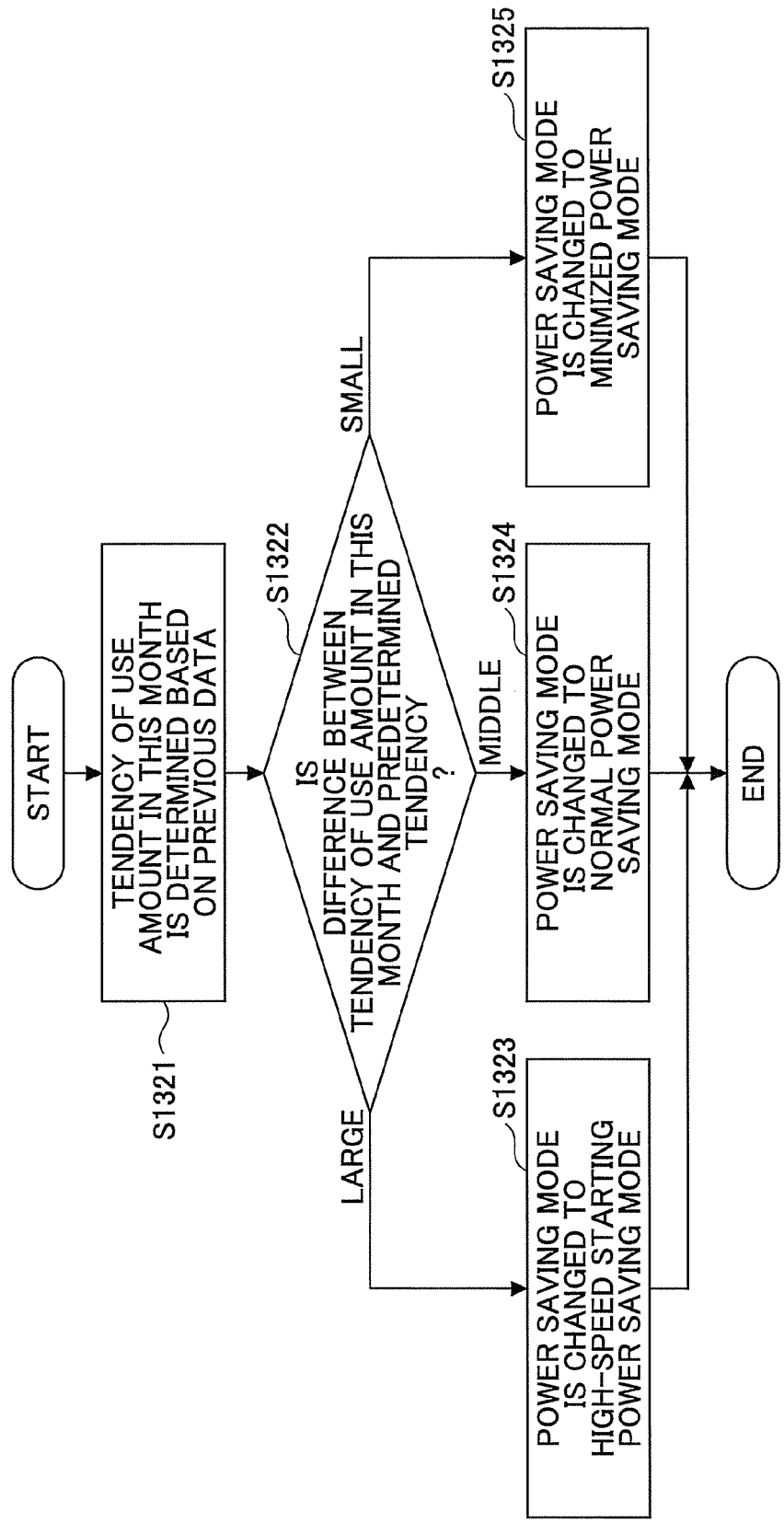

INFORMATION PROCESSING DEVICE AND NETWORK SYSTEM

BACKGROUND OF THE INVENTION

1. Field of the Invention

The present disclosure relates to an information processing device, a network system, and a power-saving control method which are adapted to monitor a power consumption of the information processing device and operate the information processing device in an appropriate operating condition for promoting power saving.

2. Description of the Related Art

Recently, power saving is demanded in electronic devices. Also in information processing devices, such as copiers, facsimiles, printers, multi-function peripherals, scanners and computers, power saving has been an important issue.

Conventionally, in an information processing device, when the device is in a standby state in which the device is not used over a predetermined time, the supply of electric power to the main component parts is suspended or the supplied voltage is reduced in order to reduce the power consumption.

Conventionally, in companies or business offices, the limit of use of information processing devices, including copiers, printers, multi-function peripherals, etc. which are interconnected by a local area network, is defined for each company section on a monthly basis, for example. If the use amount of a certain company section has reached the limit of use, the use of the information processing devices by the users who belong to the company section is restricted in order to promote power saving.

There has been proposed an information processing device which supplies an information processing service, such as a copy service, a print service or a facsimile service, in response to a request from a client over a network to which the information processing device is connected, in accordance with a charging condition. For example, refer to Japanese Laid-Open Patent Publication No. 2003-162397.

In this information processing device, the charging condition is determined based on the print data transmitted from the client, and a printing output operation is controlled based on the control condition transmitted with the print data. If the cost needed for the printing output of the requested print data exceeds a predetermined budget amount, the printing output conditions (such as the number of copies, a paper size, sorting, punching, or staple options) are changed to make the printing output executable within the budget amount, and the printing output operation is performed in the changed printing output conditions.

However, in the above-described information processing device according to the related art, when controlling the printing output operation, only the printing output conditions (such as the number of copies, a paper size, sorting, punching, or staple options) is taken into consideration and the power saving of the overall device is limited. For this reason, there has been a demand for reducing the power consumption appropriately and promoting the power saving in a planned manner with good availability.

SUMMARY OF THE INVENTION

In one aspect, the present disclosure provides an information processing device, a network system, and a power-saving control method which are adapted to reduce the power consumption in a planned manner with good availability when the information processing device is operated in one of a plurality of operating modes.

In an embodiment of the present disclosure which solves or reduces one or more of the above-mentioned problems, the present disclosure provides an information processing device including: an operation executing unit to execute a requested operation in one of a plurality of operating modes; a monitoring unit to monitor an electric power consumed by the execution of the requested operation by the operation executing unit; a memory unit to store information related to the consumed electric power; a setting unit to define a consumption period and an allowable consumed electric power within the consumption period; and a control unit to compute a consumed-electric-power log of the consumed electric power monitored by the monitoring unit at intervals of a predetermined time and a consumed-electric-power total log indicating a total of the consumed-electric-power logs, and store consumed-electric-power log related information, including the consumed-electric-power logs and the consumed-electric-power total log, in the memory unit, wherein, when an operation request is received within the consumption period, the control unit controls the execution of the requested operation by the operation executing unit based on the consumed-electric-power log related information stored in the memory unit and the allowable consumed electric power defined by the setting unit.

In an embodiment of the present disclosure which solves or reduces one or more of the above-mentioned problems, the present disclosure provides a network system in which a plurality of network devices and a power saving control device are connected to a network, each network device executing a requested operation in one of a plurality of operating modes respectively, each network device including: a monitoring unit to monitor an electric power consumed by the execution of the requested operation; and a consumed-electric-power providing unit to provide the consumed electric power monitored by the monitoring unit, to the power saving control device, the power saving control device including: a memory unit to store information related to the consumed electric power; a setting unit to define a consumption period and an allowable consumed electric power within the consumption period; and a control unit to compute a consumed-electric-power log of the consumed electric power monitored by the monitoring unit at intervals of a predetermined time and a consumed-electric-power total log indicating a total of the consumed-electric-power logs, and store consumed-electric-power log related information, including the consumed-electric-power logs and the consumed-electric-power total log, in the memory unit, wherein, when an operation request to one of the network devices is received within the consumption period, the control unit controls the execution of the requested operation by the operation executing unit based on the consumed-electric-power log related information stored in the memory unit and the allowable consumed electric power defined by the setting unit.

Other objects, features and advantages of the present invention will become more apparent from the following detailed description when read in conjunction with the accompanying drawings.

BRIEF DESCRIPTION OF THE DRAWINGS

FIG. 16 is a diagram showing an example of an alternative-device information table of print operation.

FIG. 25 is a flowchart for explaining an operation control process performed by the network system of the seventh embodiment to change the power saving mode.

DETAILED DESCRIPTION OF THE PREFERRED EMBODIMENTS

A description will be given of embodiments of the present disclosure with reference to the accompanying drawings.

First Embodiment

Figure 1:
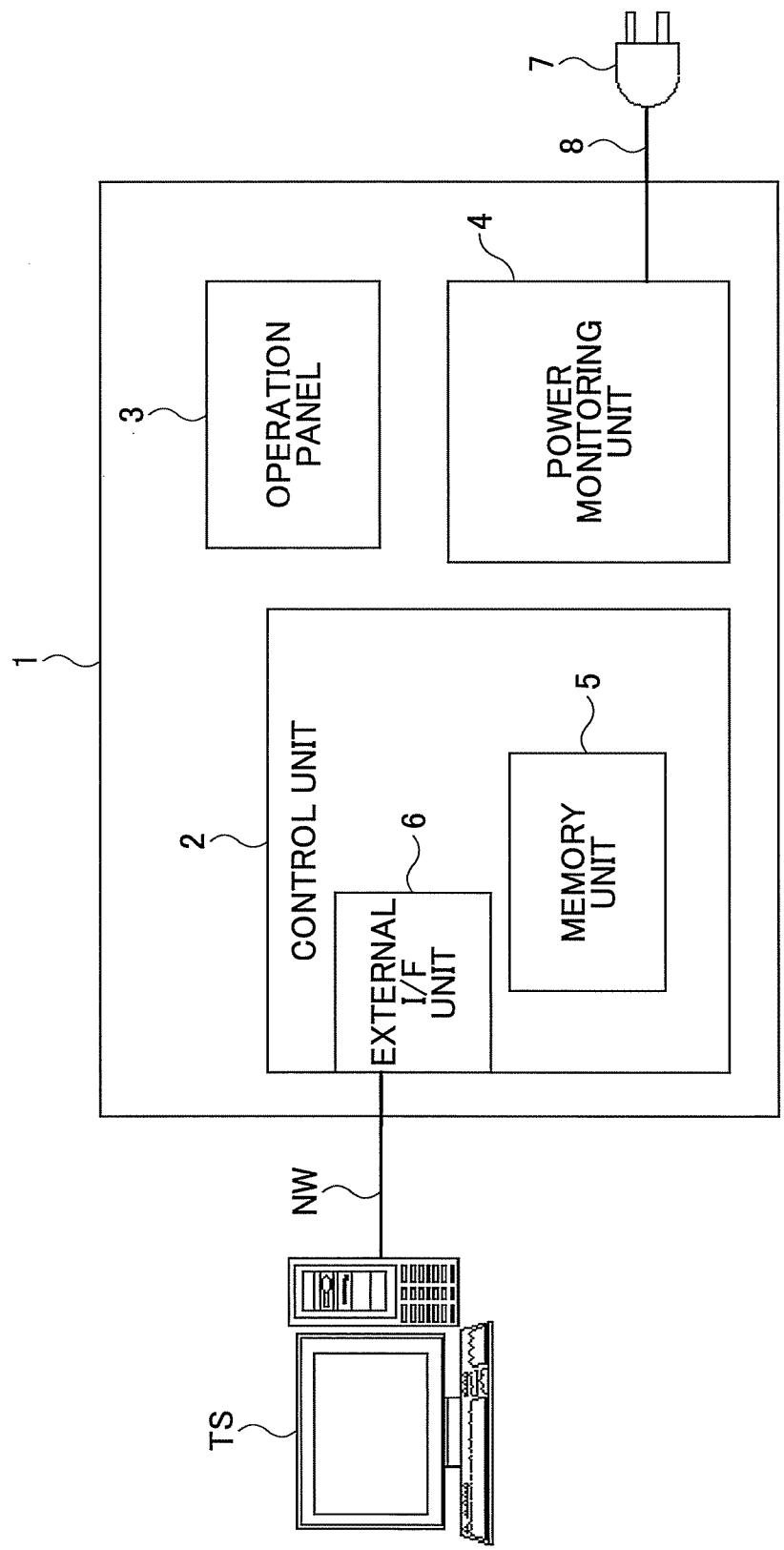
FIG. 1 is a block diagram showing the composition of an information processing device of a first embodiment of the present disclosure.

FIGS. 1-5 are diagrams for explaining a first embodiment of the present disclosure. FIG. 1 is a block diagram showing the composition of an information processing device of the first embodiment of the present disclosure. The information processing device of this embodiment is constituted by an image forming device 1 shown in FIG. 1.

As illustrated in FIG. 1, the image forming device 1 includes a control unit 2, an operation panel 3, and a power monitoring unit 4. The control unit 2 is provided with a memory unit 5 and an external interface unit 6. The control unit includes a CPU (central processing unit) which is not illustrated. The image forming device 1 includes a printer section which performs printing output of an image to a recording sheet based on image data using a predetermined image formation method, such as an electrophotographic printing method or an ink jet printing method, and a scanner section which performs scanning of a document in a main scanning direction and a sub-scanning direction to read an image of the document, which are not illustrated.

The external interface unit 6 is connected to a network NW, such as a LAN (local area network), and an external terminal device TS, such as a computer, is connected to the network NW.

The memory unit 5 includes a ROM (read only memory) and a RAM (random access memory). In the memory unit 5, a basic program of the image forming device 1, a power-saving control program for performing a power-saving control method of the present disclosure, and various kinds of data needed to execute these programs are stored. The memory unit 5 is also used as a work memory of the CPU.

In the image forming device 1, the power-saving control program for performing the power-saving control method of the present disclosure is read from a computer-readable recording medium, such as an MO (magneto-optical disk), a ROM, an EEPROM (electrically erasable programmable ROM), an EPROM, a flash memory, a flexible disk, a CD-ROM (compact-disk ROM), a CD-RW (compact disk rewritable), a DVD (digital video disk) or an SD (secure digital) card, and loaded to the memory unit 5. The thus constructed image forming device 1 forms the information processing device of this embodiment which performs the power-saving control method for controlling the operating mode in a planned range of the power consumption which is intended by the user. This power-saving control program is a computer-executable program which is described in any of legacy programming languages, such as assembler, C, C++, C#, and Java (registered trademark), or any of object-oriented programming languages, and can be stored in the above-mentioned recording medium and distributed.

The external interface unit 6 operates under the control of the CPU and performs exchange of control signals and data between the image forming device 1 and the external terminal device TS connected to the network W.

The power monitoring unit 4 (or the power consumption monitoring unit) includes a power supply cord 8 with a power supply plug 7 connected to the power monitoring unit 4. The power monitoring unit 4 receives the power-supply voltage supplied via the plug 7 and the cord 8, and converts the power-supply voltage into an internal voltage needed within the image forming device 1 by raising or lowering the power-supply voltage. Supplying the internal voltage to each part of the image forming device 1, the power monitoring unit 4 monitors the power consumption in each of the operating modes of the image forming device 1. The power monitoring unit 4 outputs the monitored power consumption to the control unit 2.

The image forming device 1 is operated in one of the plurality of operating modes by using the resources of the scanner section, the printer section, and the external interface unit 6. For example, the image forming device 1 includes the copy mode processing which performs the printing output of the image data of a document read by the scanner section on a recording sheet by the printer section, the print mode processing which performs the printing output of an image on a recording sheet by the printer section based on the image data received by the external interface unit 6, the scan mode processing which outputs the image data of a document read by the scanner section to an external device via the external interface unit 6, and the scan-to-folder mode processing which transmits the image data of a document read by the scanner section to either a folder of the memory unit 5 or a folder provided in a memory unit of a computer connected to the network NW via the external interface unit 6, and stores the image data in the folder.

Moreover, the image forming device 1 includes a plurality of power saving modes as the power saving mode which reduces the power consumption. Namely, the image forming device 1 includes: a high-speed starting power saving mode in which the power consumption is comparatively large but the startup of the image forming device 1 is very quick; a normal power saving mode in which the startup speed is normal and the latency time from the standby mode to the power saving mode is normal; and a minimized power saving mode in which the startup speed is low, the latency time from the standby mode to the power saving mode is comparatively short and the power consumption is minimized.

The operation panel (a setting unit, a notification unit) 3 is provided with a display (for example, liquid crystal display) and LED (light emitting diode) lamps, and provided with various operation keys needed for the user (or the operator) to operate the image forming device 1. In the operation panel 3, any of various operations (for example, setting input operation of a power consumption budget which is an allowable consumed electric power) needed for performing the power-saving control process (which will be described below) and various operations needed for performing various mode processes of the image forming device 1 are input from the operation keys. In the operation panel 3, the variety of information which is notified to the operator by the image forming device 1 and the content of a command inputted from the operation keys are displayed on the display.

Figure 2:
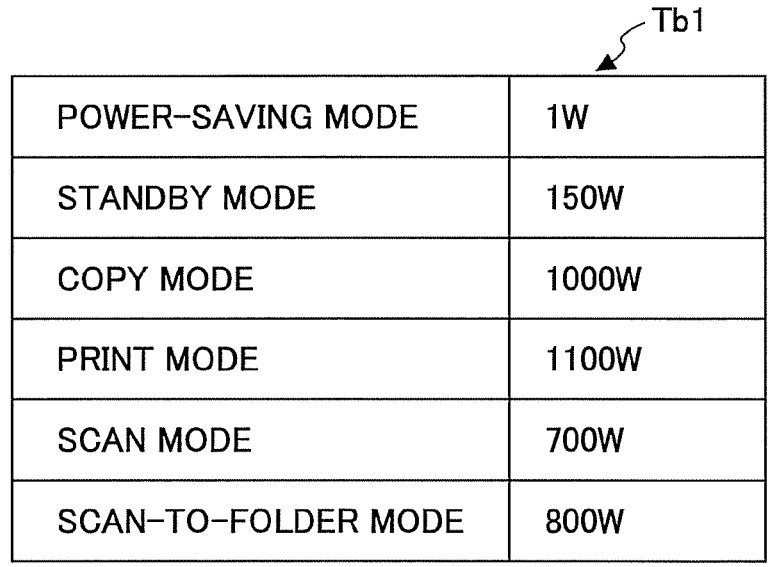
FIG. 2 is a diagram showing an example of a standard power consumption table for each mode.

In the memory unit 5 of the image forming device 1, a standard power consumption table Tb1 for each mode is stored as shown in FIG. 2. For example, the power consumption of the image forming device 1 in each mode is measured beforehand and the measured power consumption is acquired so that the standard power consumption table Tb1 is stored in the memory unit 5.

As shown in FIG. 2, in the standard power consumption table Tb1 of this embodiment, 1 W (watt) is registered for the power saving mode, 150 W is registered for the standby mode, 1000 W is registered for the copy mode, 1100 W is registered for the print mode, 700 W is registered for the scan mode, and 800 W is registered for the scan-to-folder mode. For the sake of explanation, the power consumption of this embodiment is uniformly registered for each mode. Practically, however, the power consumption may vary even when the image forming device is operated in the same operating mode. Although the power consumption in the print mode, for example, is set to 1100 W in this embodiment, the practical power consumption varies, even in the print mode, depending on the print conditions including a paper size, a color printing, a monochrome printing, etc.

Next, the operation of this embodiment will be described. The image forming device 1 of this embodiment performs control of the processing of a requested operation for which an operation request is received, in a manner that the limit of a power consumption budget (budget amount) which is an allowable consumed electric power which is defined beforehand by the user for each predefined consumption period is not exceeded.

Figure 3:
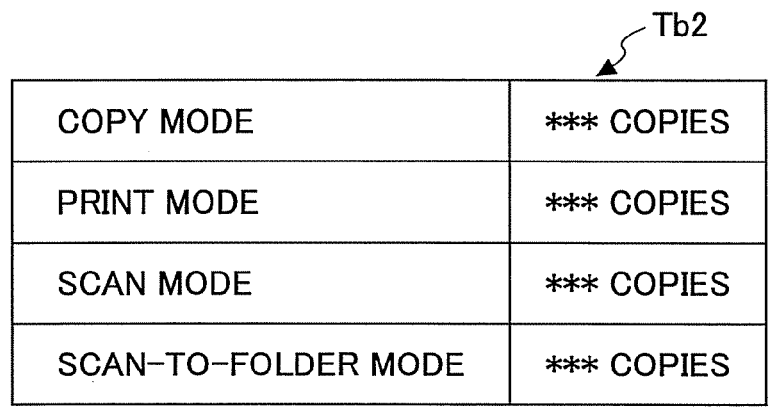
FIG. 3 is a diagram showing an example of an allowable use amount table for each mode in a predefined consumption period.

For example, the user (or administrator) of the image forming device 1 performs a setting input of an allowable electric power to be consumed by the image forming device 1 in each predetermined consumption period on a monthly basis, from the operation panel or through the computer connected via the network. After the setting input of the allowable electric power is performed in the image forming device 1, the control unit 2 accesses the standard power consumption table Tb1 stored in the memory unit 5. The control unit 2 computes the allowable use amount (for example, the number of copies) for each mode in the defined consumption period (for example, on a monthly basis) and registers the same in the allowable use amount table Tb2 as shown in FIG. 3. The control unit 2 stores the allowable use amount table Tb2 in the memory unit 5. Therefore, the external interface unit 6 and the external terminal device TS also function as the setting unit.

The control unit 2 registers in the memory unit 5 the allowable use amount table Tb2 for each of different users.

In the following, for the sake of explanation, the user or the administrator defines the allowable electric power of each month, and the allowable use amount of each month for each mode is computed with respect to the defined allowable electric power. The allowable use amount of each mode (or the allowable number of operations of each mode) when it is assumed that the allowable electric power is consumed by the execution of the requested operation in each mode is registered in the allowable use amount table Tb2.

Figure 4:
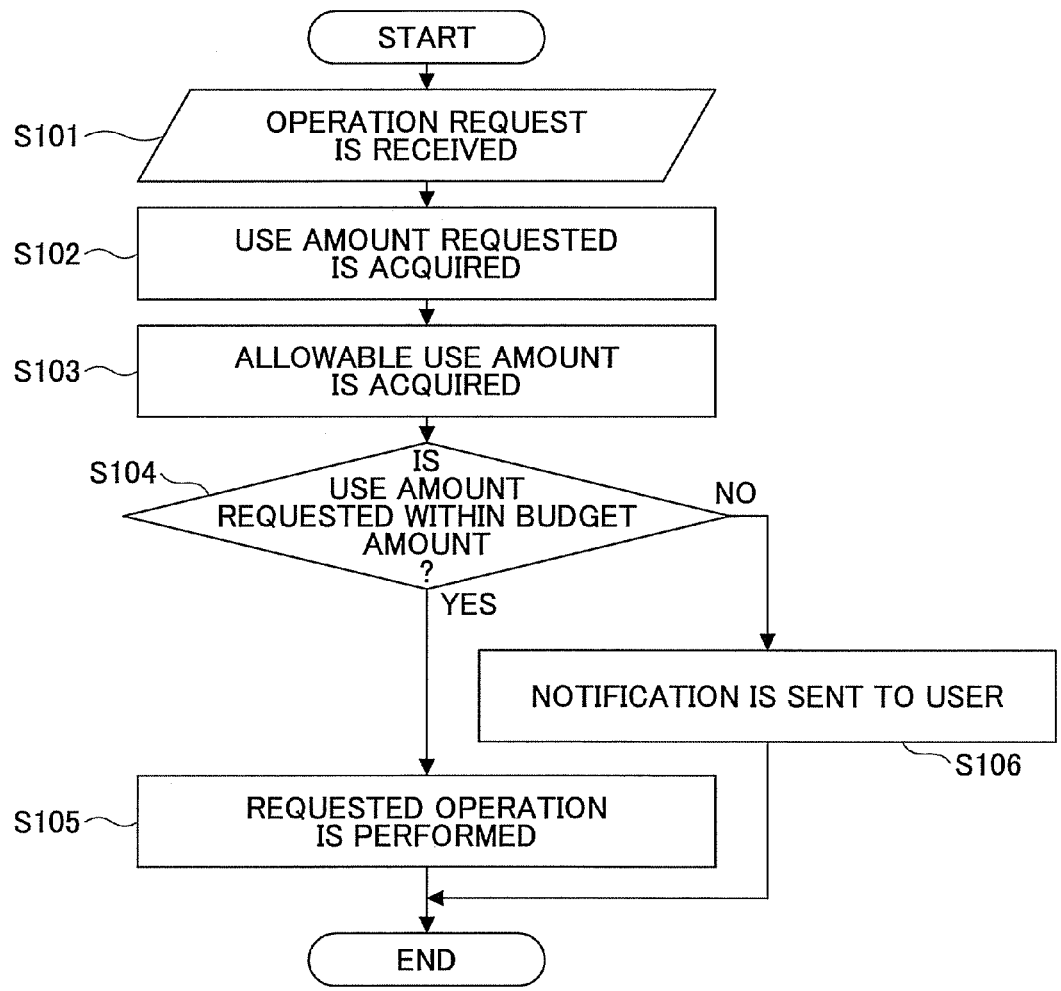
FIG. 4 is a flowchart for explaining a basic operation control process performed by the information processing device of this embodiment.

Accordingly, if the user sends an operation request, such as a print request, to the image forming device 1, the image forming device 1 performs the operation control process in the state in which the allowable use amount table Tb2 is registered in the memory unit 5, based on the user's defined allowable use amount and the content of the requested operation as shown in FIG. 4.

In the flowchart of FIG. 4, the control unit 2 receives an operation request, such as a print request, from the operation panel or the external terminal device TS connected to the network NW (step S101). The control unit 2 analyzes the content of the operation request and acquires the number of copies requested by the operation request this time (the use amount requested) (step S102).

Subsequently, the control unit 2 accesses the allowable use amount table Tb2 shown in FIG. 3 and acquires the allowable use amount corresponding to the requested use amount of the operation request (step S103). The control unit 2 determines whether a total of the number of copies consumed by the previous execution of the past operations of this month and the number of copies by the requested operation when the requested operation is performed at this time (the use amount requested) is within the limit of the budget amount of this month (the allowable use amount) (step S104).

Figure 5:
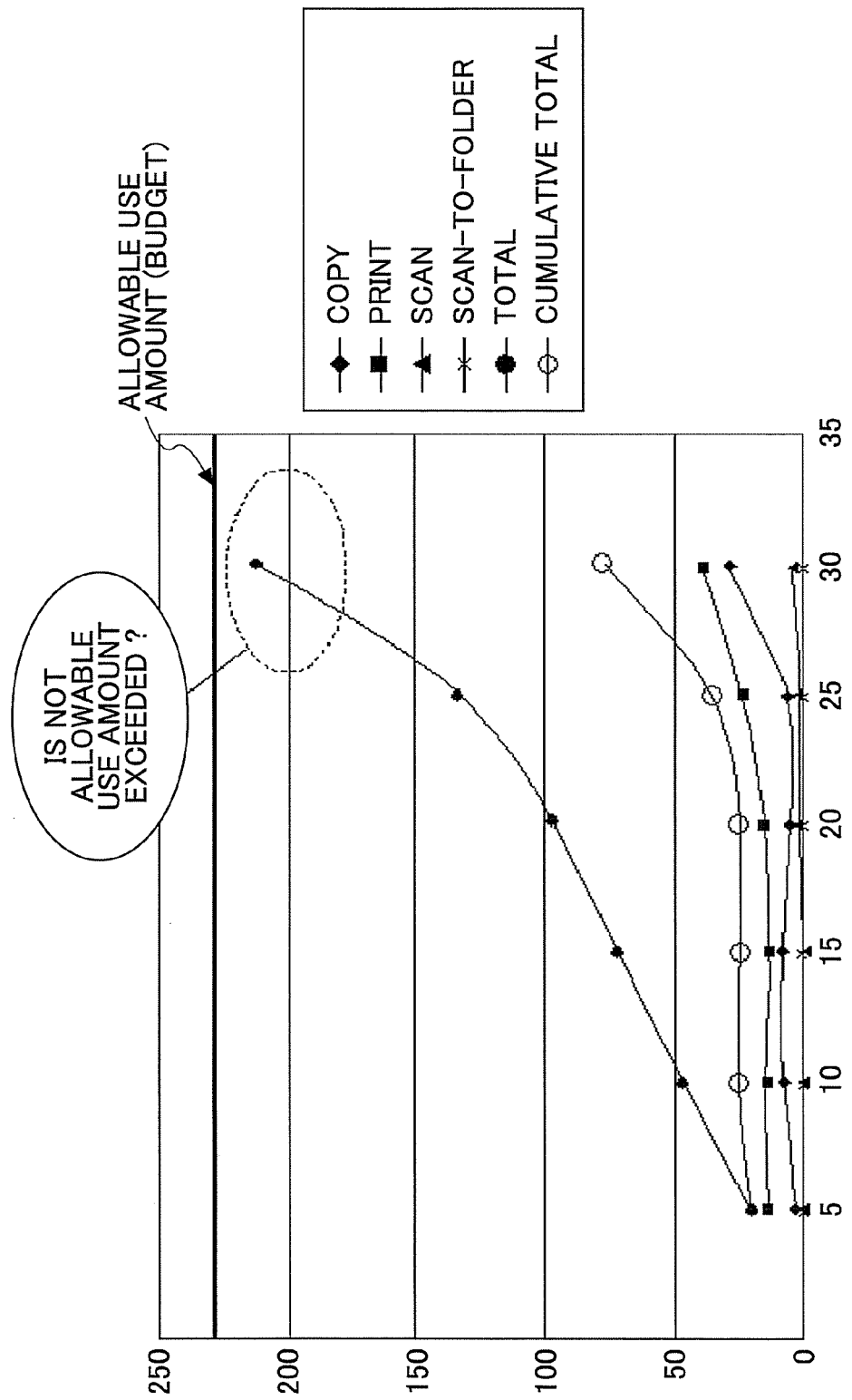
FIG. 5 is a diagram showing the relationship between the total number of copies executed (use amount requested) and the allowable use amount (budget amount) when the use amount requested is within the budget amount.

FIG. 5 is a diagram showing the relationship between the total number of copies executed (use amount requested) and the allowable use amount (budget amount) when the use amount requested is within the budget amount. For example, as shown in FIG. 5, the control unit 2 counts the execution operation amount in each of the copy mode, the print mode, the scan mode, and the scan-to-folder mode (the number of copies executed), computes the cumulative total of each daily execution operation amount (the number of copies executed) in each mode, and further computes the total of the execution operation amounts of all the modes of the month (the total number of copies). The control unit 2 determines whether the total of the execution operation amounts of all the modes of the month (the operation amount total log of the modes) is within the limit of the budget amount of the month (the allowable use amount) computed from the predefined power consumption budget of the month.

When it is determined in the step S104 that the limit of the budget amount is not exceeded even if the requested operation is performed, the control unit 2 performs the requested operation requested by the user (step S105). Then, the operation control process is terminated. For example, when the allowable use amount (the number of copies) which is the predefined budget amount of this month is not exceeded at the portion as indicated by the dotted line in FIG. 5, the control unit 2 determines that the execution of the requested operation is allowed. Hence, the control unit 2 performs the requested operation in the step S105.

On the other hand, when it is determined in the step S104 that the limit of the budget amount is exceeded if the requested operation is performed, the control unit 2 outputs a notification indicating refusal of the operation request or the excess of the use amount (step S106). For example, in the step S106, the control unit 2 displays an image of the notification on the display of the operation panel 3, or transmits a message of the notification to the external terminal device TS via the external interface unit 6. Then, the operation control process is terminated without performing the requested operation.

Figure 6:
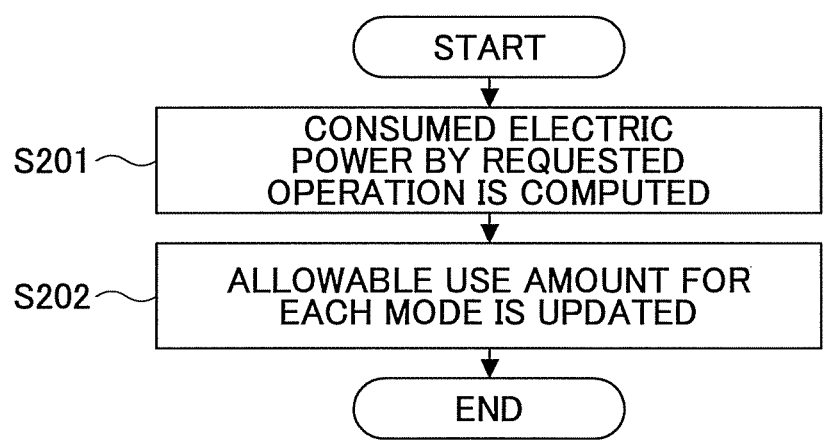
FIG. 6 is a flowchart for explaining an allowable use amount updating process performed by the information processing device of the first embodiment.

After the operation control process is performed in response to the operation request from the user as mentioned above, the image forming device 1 updates the allowable use amount table Tb2 as shown in FIG. 6.

In the flowchart of FIG. 6, after the requested operation from the user is performed, the image forming device 1 computes the consumed electric power consumed by the execution of the requested operation (step S201). Based on the computed consumed electric power, the control unit updates the allowable use amount table Tb2. The allowable use amount for each mode (the remaining allowable use amount) is computed again by assuming that the power consumption budget is consumed by the execution of the requested operation.

In the present embodiment, the allowable use amount for each mode is updated and the operation control process is performed based on the updated allowable use amount. Alternatively, a log of the allowable operation amount (the use amount) for each mode and a total of the allowable operation amount logs of all the modes (the use amount total) may be computed and stored, and the operation control process may be performed based on the total of the allowable operation amount logs computed.

In the present embodiment, the number of copies executed is used as the use amount. Alternatively, the operation control process may be performed by using the consumed electric power.

As described above, the image forming device 1 of this embodiment is arranged so that if a requested operation in one of the operating modes is performed, the consumed electric power consumed by the execution of the operation in one of the modes is monitored by the power monitoring unit 4. If a predetermined consumption period (for example, month) and an allowable consumed electric power within the consumption period are defined, the control unit 2 computes a consumed-electric-power log of the consumed electric power monitored at intervals of a predetermined time by the power monitoring unit 4 and a consumed-electric-power total log indicating the total of the consumed-electric-power logs. The control unit 2 stores consumed-electric-power log related information, including the consumed-electric-power logs and the consumed-electric-power total log, into the memory unit 5. If an operation request in a predetermined mode of operation is received within the consumption period, the control unit 2 controls execution of the requested operation in the mode based on the consumed-electric-power log related information and the allowable consumed electric power stored in the memory unit 5. Therefore, when the image forming device 1 is operated in one of the operating modes, the power consumption can be reduced in a planned manner with good availability.

In the image forming device 1 of this embodiment, if the control unit 2 determines that the execution of the requested operation in the mode is not allowed, the control unit 2 displays an image of the notification on the display of the operation panel 3, or transmits a message of the notification to the external terminal device TS of the requesting user via the external interface unit 6. The information output from the control unit 2 is received at the requesting user. Therefore, the user of the image forming device 1 can grasp the power consumption situation, and it is possible to reduce the power consumption in a planned manner with good availability.

Second Embodiment

Figure 7:
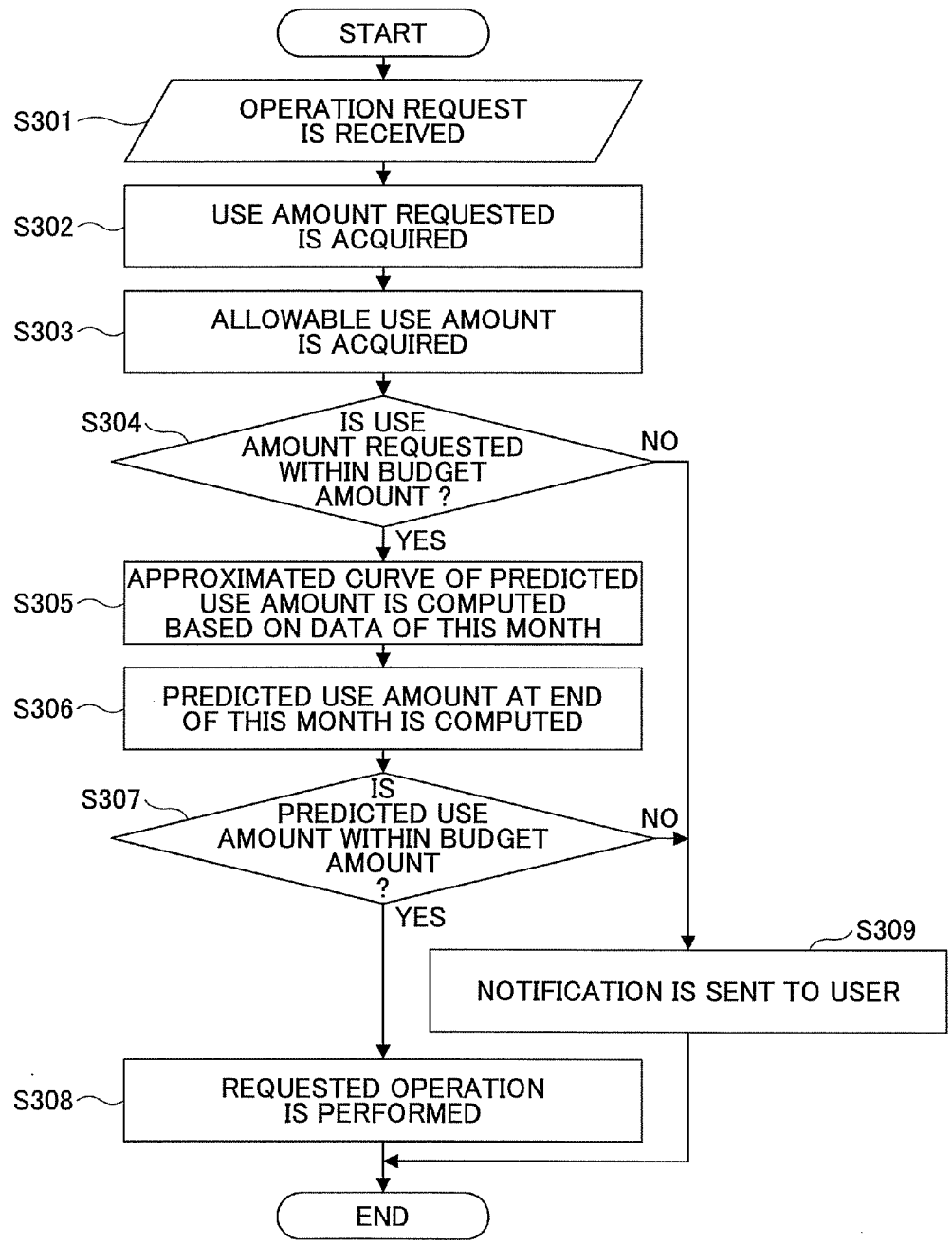
FIG. 7 is a flowchart for explaining an operation control process performed by an information processing device of a second embodiment of the present disclosure.
Figure 8:
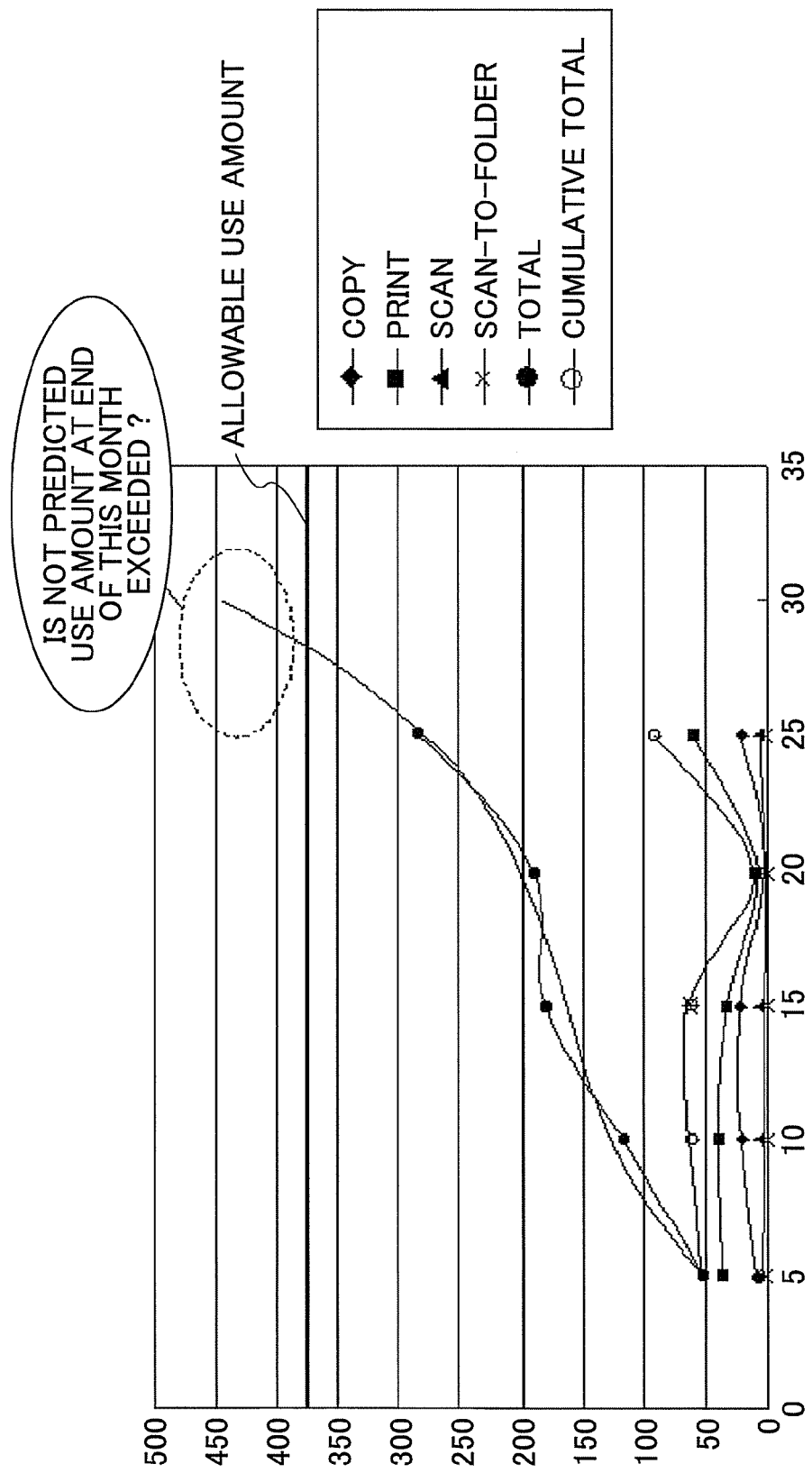
FIG. 8 is a diagram showing the relationship between the predicted total number of copies (predicted use amount) and the allowable number of copies (allowable use amount).
Figure 9:
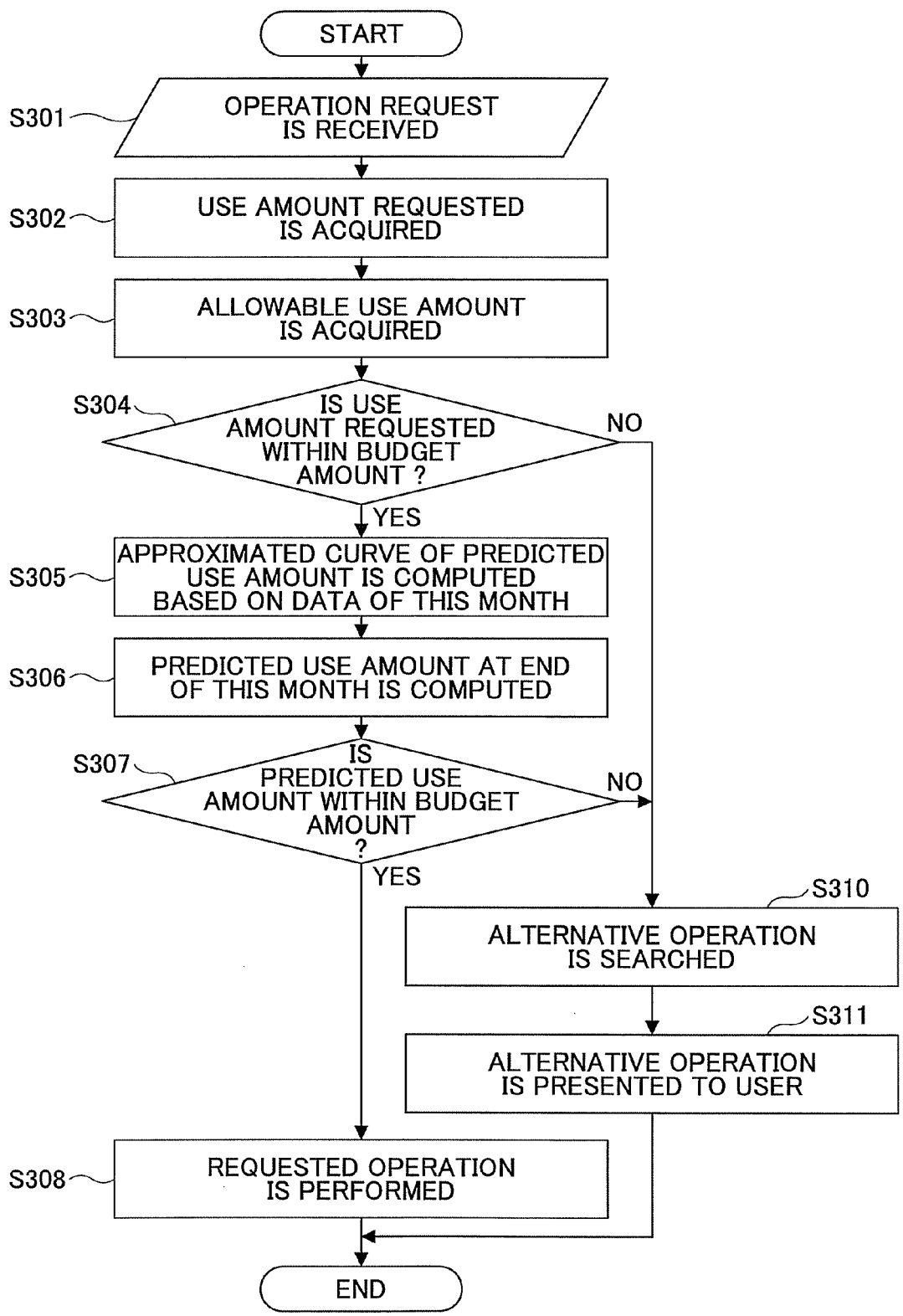
FIG. 9 is a flowchart for explaining an operation control process performed by the information processing device of the second embodiment.

FIGS. 7-9 are diagrams for explaining a second embodiment of the present disclosure. The information processing device of this embodiment is constituted by the image forming device 1 of the first embodiment. In this embodiment, the elements which are the same as corresponding elements in the first embodiment are designated by the same reference numerals, and a description thereof will be omitted.

This embodiment computes a predicted use amount of a requested operation at the end of the consumption period, which is the basis for determining whether the requested operation can be performed within the limit of a power consumption budget (allowable use amount) which is defined beforehand for each predefined consumption period by the user, and controls the execution of the requested operation based on the predicted use amount and the allowable use amount.

As shown in FIG. 5, in the image forming device 1 of this embodiment, if a requested operation is performed in response to an operation request from the user, the control unit 2 counts the execution operation amount in each of the copy mode, the print mode, the scan mode, and the scan-to-folder mode (the number of copies executed), computes the cumulative total of each daily execution operation amount (the number of copies executed) in each mode, and further computes the total of the execution operation amounts of all the modes of the month (the total number of copies) and stores the same in the memory unit.

As shown in FIG. 6, the control unit 2 computes the allowable use amount for each mode (the remaining allowable use amount) by assuming that the power consumption budget is consumed by the execution of the requested operation, and updates the allowable use amount table Tb2. If an operation request from the user is received, the image forming device 1 of this embodiment performs the operation control process based on the allowable use amount of the updated table, the predicted allowable use amount at the end of the consumption period, and the content of the requested operation as shown in FIG. 7.

In the flowchart of FIG. 7, the control unit 2 receives the operation request, such as a print request, from the operation panel or the external terminal device TS connected to the network NW (step S301). The control unit 2 analyzes the content of the operation request and acquires the number of copies requested by the operation request this time (the use amount requested) (step S302).

Subsequently, the control unit 2 accesses the allowable use amount table Tb2 shown in FIG. 3 and acquires the allowable use amount corresponding to the requested use amount of the operation request (step S303). The control unit 2 determines whether the total number of copies consumed by the previous execution of the past operations of this month and the number of copies by the requested operation when it is performed at this time (the use amount requested) is within the limit of the budget amount of this month (the allowable use amount) (step S304).

When it is determined in the step S304 that the limit of the budget amount of this month is not exceeded even if the requested operation is performed, the control unit 2 computes the approximated curve of the predicted use amount of this month as shown in FIG. 8 based on the past use amount of this month (step S305). The control unit 2 computes the predicted use amount at the end of this month based on the approximated curve (step S306). The control unit 2 determines whether the predicted use amount is within the limit of the budget amount of this month (the allowable use amount) (step S307). That is, the predicted number of copies at the end of this month (the predicted use amount) is computed using the approximated curve based on the number of copies of operation of each mode and the total number of copies of all the modes as shown in FIG. 8, and it is determined whether the predicted number of copies at the end of this month (the predicted use amount) exceeds the allowable number of copies of this month (the budget amount).

When it is determined in the step S307 that the limit of the budget amount is not exceeded, the control unit 2 performs the requested operation (step S308). Then, the operation control process is terminated.

On the other hand, when it is determined in the step S307 that the predicted use amount at the end of this month exceeds the allowable use amount (budget amount), the control unit 2 supplies a notification indicating the excess of the allowable use amount to the user (step S309). For example, in the step S309, the control unit 2 displays an image of the notification on the display of the operation panel 3, or transmits a message of the notification to the external terminal device TS via the external interface unit 6. Then, the operation control process is terminated without performing the requested operation.

For example, in the case of FIG. 8, as indicated by the dotted line in FIG. 8, the predicted use amount exceeds the allowable number of copies (the allowable use amount) which is the budget amount of this month. In this case, the control unit 2 determines that the execution of the requested operation is not allowed, sends the notification to the user, and stops the execution of the requested operation.

Alternatively, in this case, only a notification indicating that the budget amount will be exceeded if the operating condition of this month is considered and the operating condition in this case is continued without change may be sent to the user, and the requested operation may be performed.

When it is determined in the step S304 that the use amount requested is not within the limit of the budget amount, the control unit 2 displays an image of the notification on the display of the operation panel 3, or transmits a message of the notification to the external terminal device TS via the external interface unit 6 (step S309). Then, the operation control process is terminated without performing the requested operation.

As described above, in this embodiment, the predicted use amount of the requested operation at the end of the consumption period is computed, the execution of the requested operation can be controlled based on the predicted use amount, and the power consumption can be reduced in a planned manner with good availability.

Furthermore, in this embodiment, when the budget amount will be exceeded at the end of the month (or the end of the consumption period) if the requested operation is performed, not only it is possible to stop the execution of the requested operation and notify the user of the excess of the allowable use amount, but also it is possible to search an alternative operation according to the budget amount and notify the user of the searched alternative operation as shown in FIG. 9.

In FIG. 9, the elements which are the same as corresponding elements in FIG. 7 are designated by the same reference numerals, and a description thereof will be omitted.

In the flowchart of FIG. 9, steps S301 to S308 are the same as corresponding steps in the flowchart of FIG. 7, and a description thereof will be omitted. Only the point of the flowchart of FIG. 9 which differs from the flowchart of FIG. 7 will be described.

When it is determined in the step S304 or the step S307 that the amount of predicted power consumption at the end of this month exceeds the limit of the budget amount (the allowable use amount), the control unit 2 searches an alternative operation to be performed instead of the requested operation, which operation needs a smaller power consumption and does not cause the limit of the budget amount to be exceeded if the operation is performed (step S310). Subsequently, the control unit 2 displays an image of the searched alternative operation on the display of the operation panel 3, or transmits a message of the notification to the external terminal device TS via the external interface unit 6 (step S311). Hence, the notification sent to the user at this step is that if the requested operation is performed, the limit of the budget amount is exceeded at the end of this month, and the alternative operation is to be performed instead of the requested operation. Then, the operation control process is terminated.

For example, when searching the alternative operation, the standard power consumption table Tb1 shown in FIG. 2 may be used. In this case, an approximated curve is computed for each alternative operation (alternative mode) and the alternative operation which is within the limit of the budget amount is searched.

As described above, in this embodiment, the user of the image forming device 1 can grasp the power consumption situation, the alternative operation to be performed in the alternative mode can be chosen, and the power consumption can be appropriately reduced with good availability.

Third Embodiment

Figure 10:
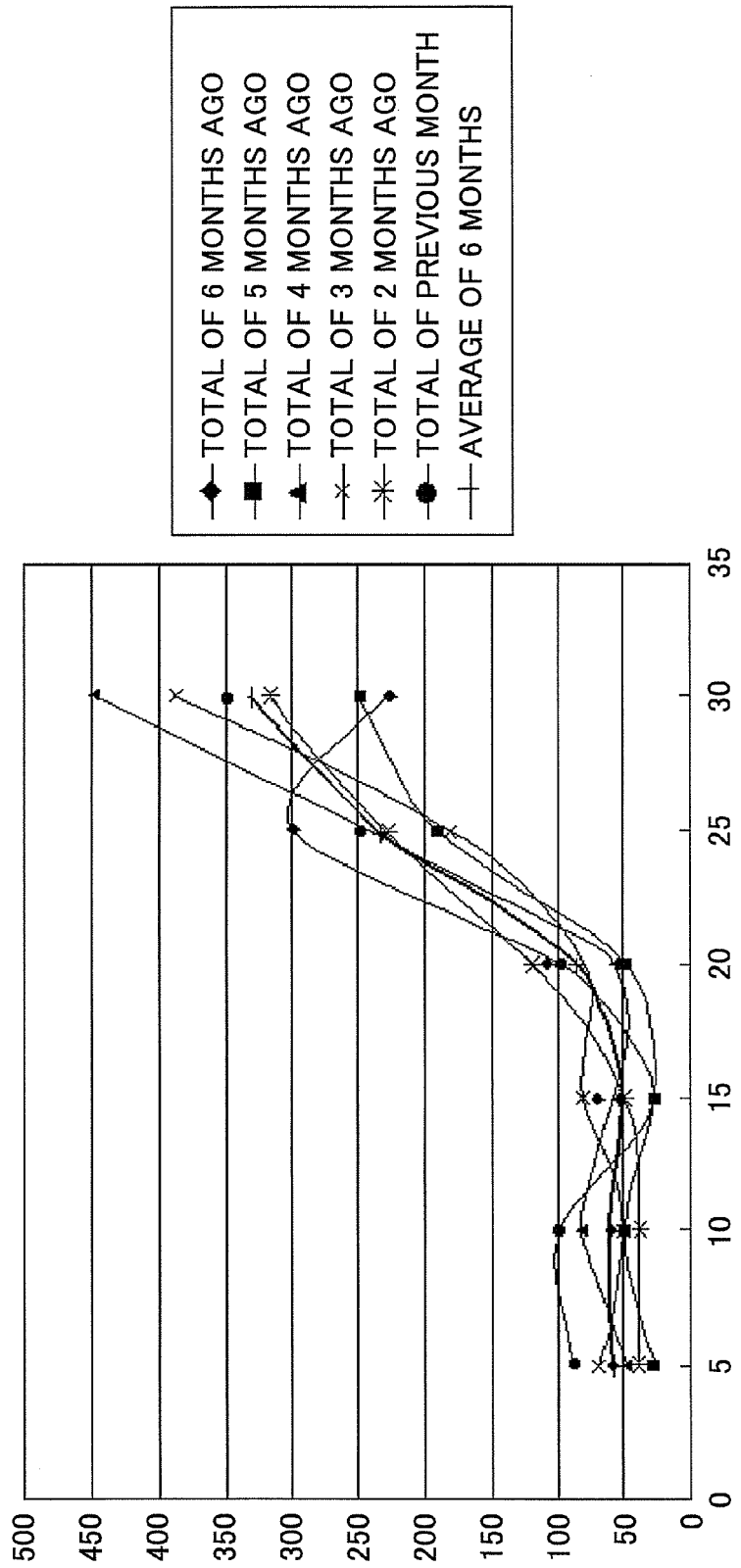
FIG. 10 is a diagram showing an example of the total use amount in past two or more months.
Figure 11:
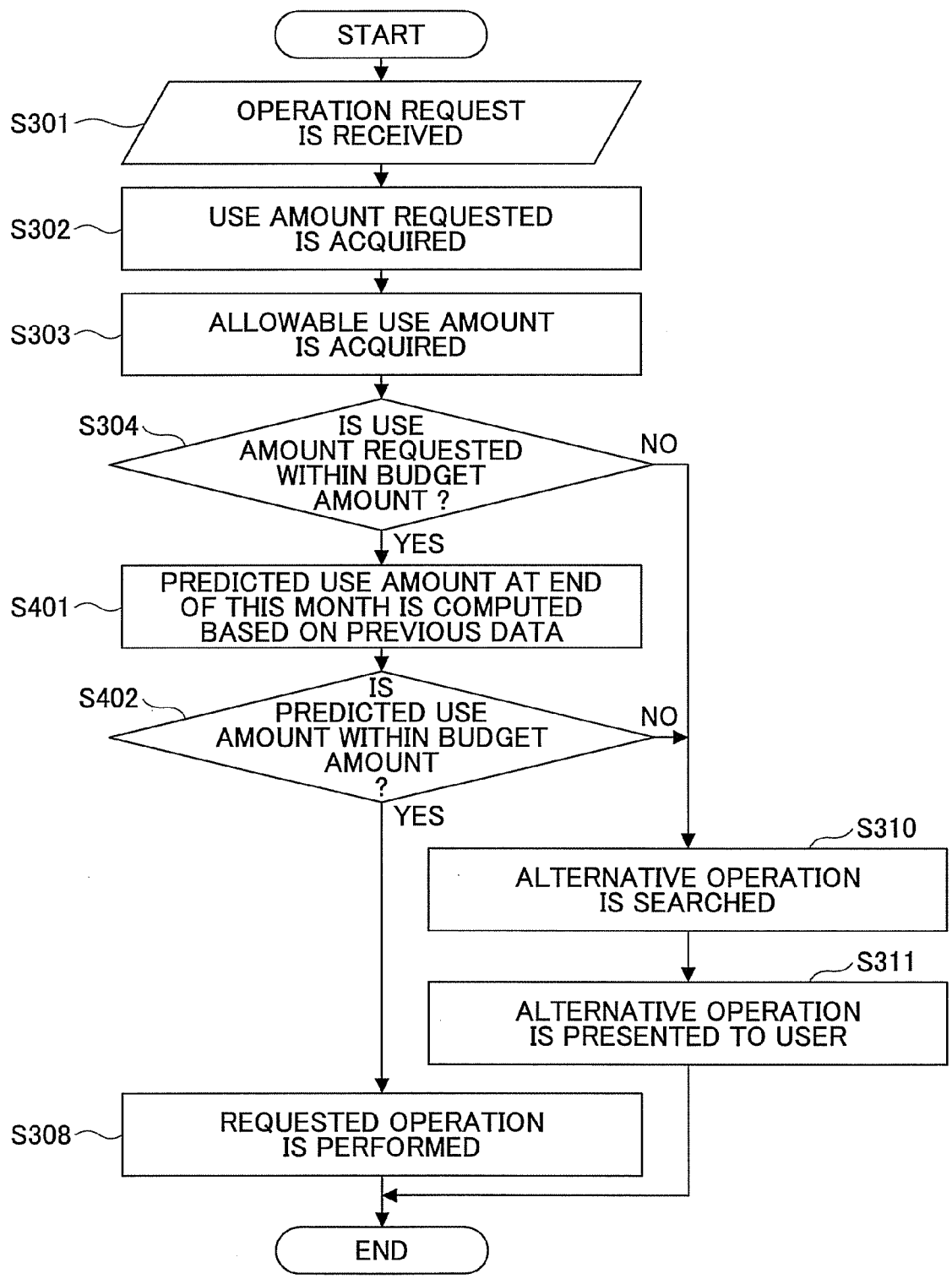
FIG. 11 is a flowchart for explaining an operation control process performed by an information processing device of a third embodiment of the present disclosure.

FIGS. 10 and 11 are diagrams for explaining a third embodiment of the present disclosure.

FIG. 10 is a diagram showing the total use amount and the total use amount average in the past two or more months for use in the image forming device of this embodiment, and FIG. 11 is a flowchart for explaining an operation control process performed by the information processing device of this embodiment.

The information processing device of this embodiment is constituted by the image forming device 1 of the first embodiment. In this embodiment, the elements which are the same as corresponding elements in the first embodiment are designated by the same reference numerals, and a description thereof will be omitted.

The image forming device 1 of this embodiment computes a predicted use amount of a requested operation at the end of the consumption period based on the past total use amount, and the predicted use amount is the basis for determining whether the requested operation can be performed within the limit of the power consumption budget which is defined beforehand for each predefined consumption period by the user.

In the image forming device 1 of this embodiment, the control unit 2 is similar to the image forming device 1 of the first embodiment. As shown in FIG. 5, if a requested operation is performed in response to an operation request from the user, the control unit 2 counts the execution operation amount of the consumption period (for example, on a monthly basis) in each of the copy mode, the print mode, the scan mode, and the scan-to-folder mode (the number of copies executed), computes the cumulative total of each daily execution operation amount (the number of copies executed) in each mode, and further computes the total of the execution operation amounts of all the modes of the month (the total number of copies) and stores the same in the memory unit.

As shown in FIG. 6, the control unit 2 computes the allowable use amount for each mode (the remaining allowable use amount within the consumption period) by assuming that the power consumption budget is consumed by the execution of the requested operation, and updates the allowable use amount table Tb2. The control unit 2 stores in the memory unit 5 the total use amount and the total use amount average in the past two or more months (e.g. six months) as shown in FIG. 10. If an operation request from the user is received, the image forming device 1 of this embodiment performs the operation control process based on the allowable use amount of the updated table, the predicted allowable use amount at the end of the consumption period, and the content of the requested operation as shown in FIG. 11.

In FIG. 11, the elements which are the same as corresponding elements in FIGS. 7 to 9 of the second embodiment are designated by the same reference numerals, and a description thereof will be omitted.

In the flowchart of FIG. 11, if an operation request, such as a print request, from the operation panel or the external terminal device TS connected to the network NW is received (step S301), the control unit 2 analyzes the content of the operation request. The control unit 2 acquires the number of copies (the use amount) requested by the operation request this time (step S302).

Subsequently, the allowable use amount corresponding to the requested content of the operation request is acquired by accessing the allowable use amount table Tb2 shown in FIG. 3 (step S303). It is determined whether the number of copies consumed by the requested operation (the use amount) is within the limit of the budget amount of this month (the allowable use amount) (step S304).

When the result of the determination in the step S304 is affirmative, the control unit 2 computes the amount of predicted power consumption at the end of this month based on the total use amount of the past months and the total use amount average of the past months stored in the memory unit 5 (step S401). It is determined whether the amount of predicted power consumption is within the limit of the budget amount of this month (the allowable use amount) (step S402).

When it is determined in the step S402 that the amount of predicted power consumption at the end of this month is within the limit of the allowable use amount (budget), the control unit 2 performs the requested operation (step S308). Then, the operation control process is terminated.

When it is determined in the step S402 that the amount of predicted power consumption at the end of this month exceeds the allowable use amount (budget), there is a possibility that the budget amount be exceeded if the requested operation is performed. Thus, the control unit 2 searches the alternative operation of less power consumption instead of the requested operation (step S310).

Subsequently, the control unit 2 displays an image of the searched alternative operation on the display of the operation panel 3 or transmits a message of the notification to the external terminal device TS via the external interface unit 6 (step S311). The notification sent to the user at this step is that if the requested operation is performed, the budget amount is exceeded at the end of this month, and the alternative operation presented to the user is to be performed instead of the requested operation. Then, the operation control process is terminated.

Alternatively, when it is determined in the step S402 that the amount of predicted power consumption at the end of this month exceeds the allowable use amount, the control unit 2 may send to the user a message indicating that execution of the requested operation is suspended because the amount of predicted power consumption will exceed the allowable use amount, without presenting the alternative operation.

Thus, in the image forming device 1 of this embodiment, the consumed electric power of the consumption period can be predicted accurately, execution of the requested operation can be controlled, and the power consumption can be reduced in a planned manner with good availability. The control unit 2 in this embodiment compares the prediction consumption power and the allowable consumed electric power and controls the execution of requested operation. Therefore, the consumed electric power of the consumption period can be predicted accurately, the execution of the requested operation can be controlled, and the power consumption can be reduced in a planned manner with good availability.

Fourth Embodiment

Figure 12:
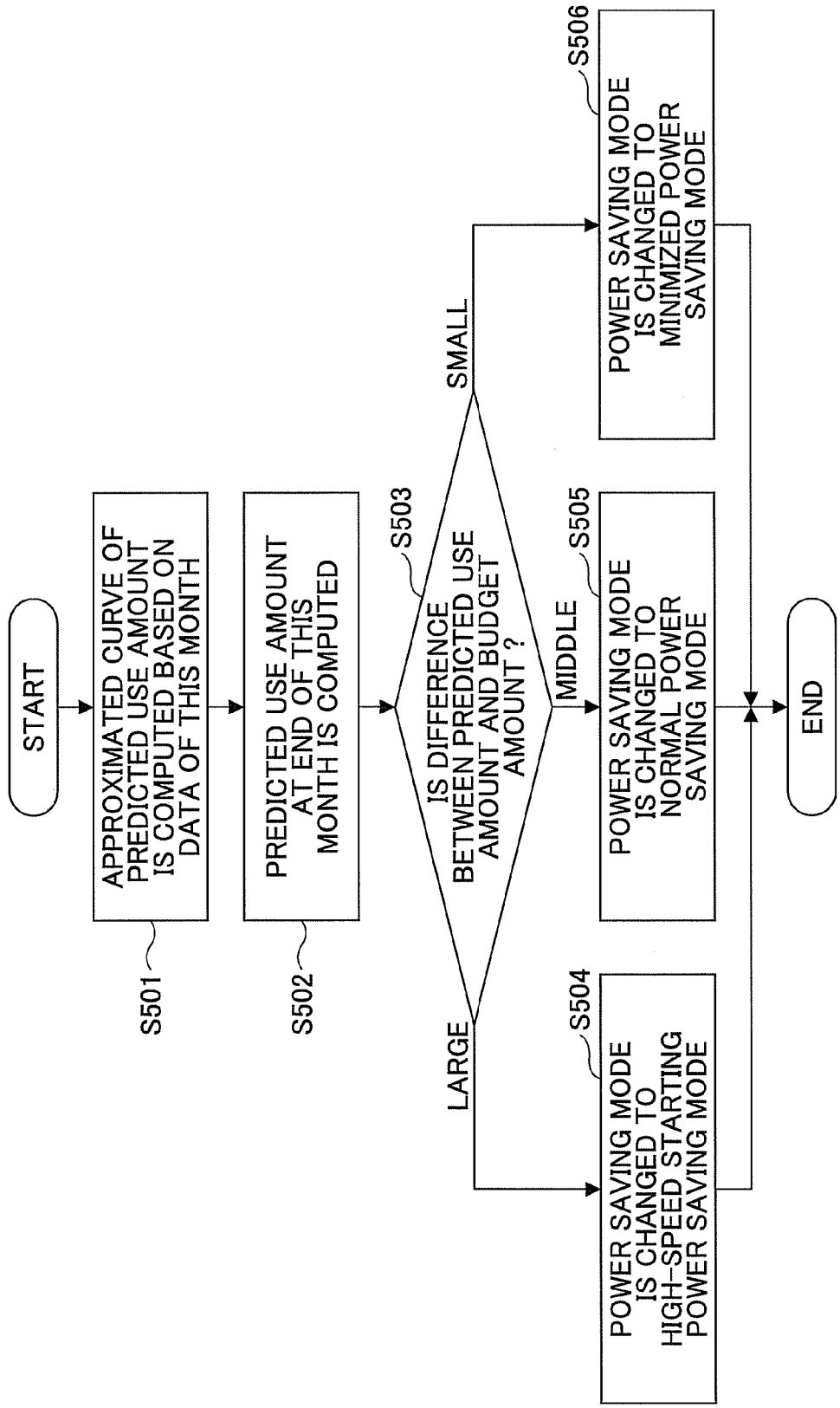
FIG. 12 is a flowchart for explaining an operation control process performed by an information processing device of a fourth embodiment of the present disclosure to change the power saving mode.
Figure 13:
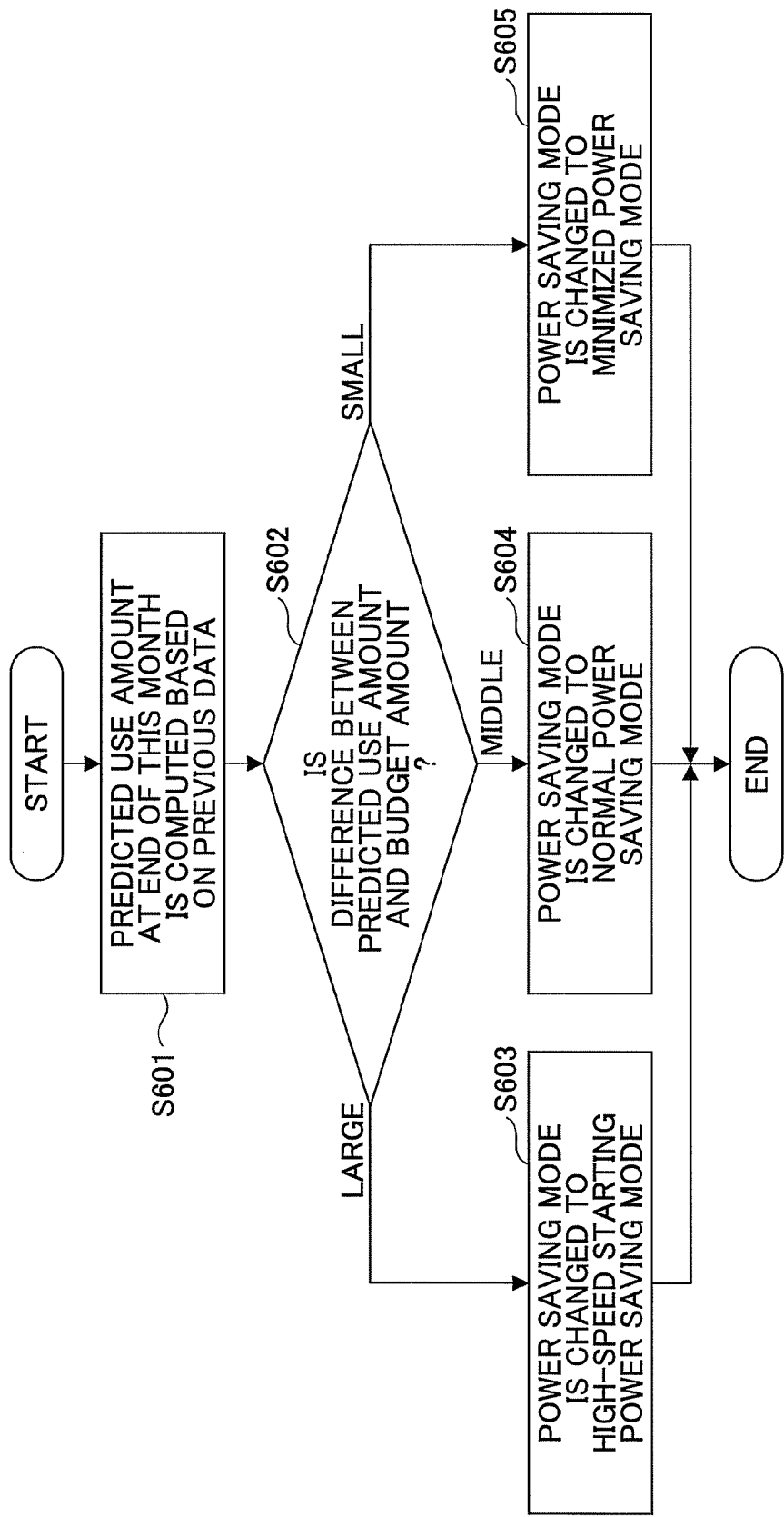
FIG. 13 is a flowchart for explaining an operation control process performed by the information processing device of the fourth embodiment to change the power saving mode.
Figure 14:
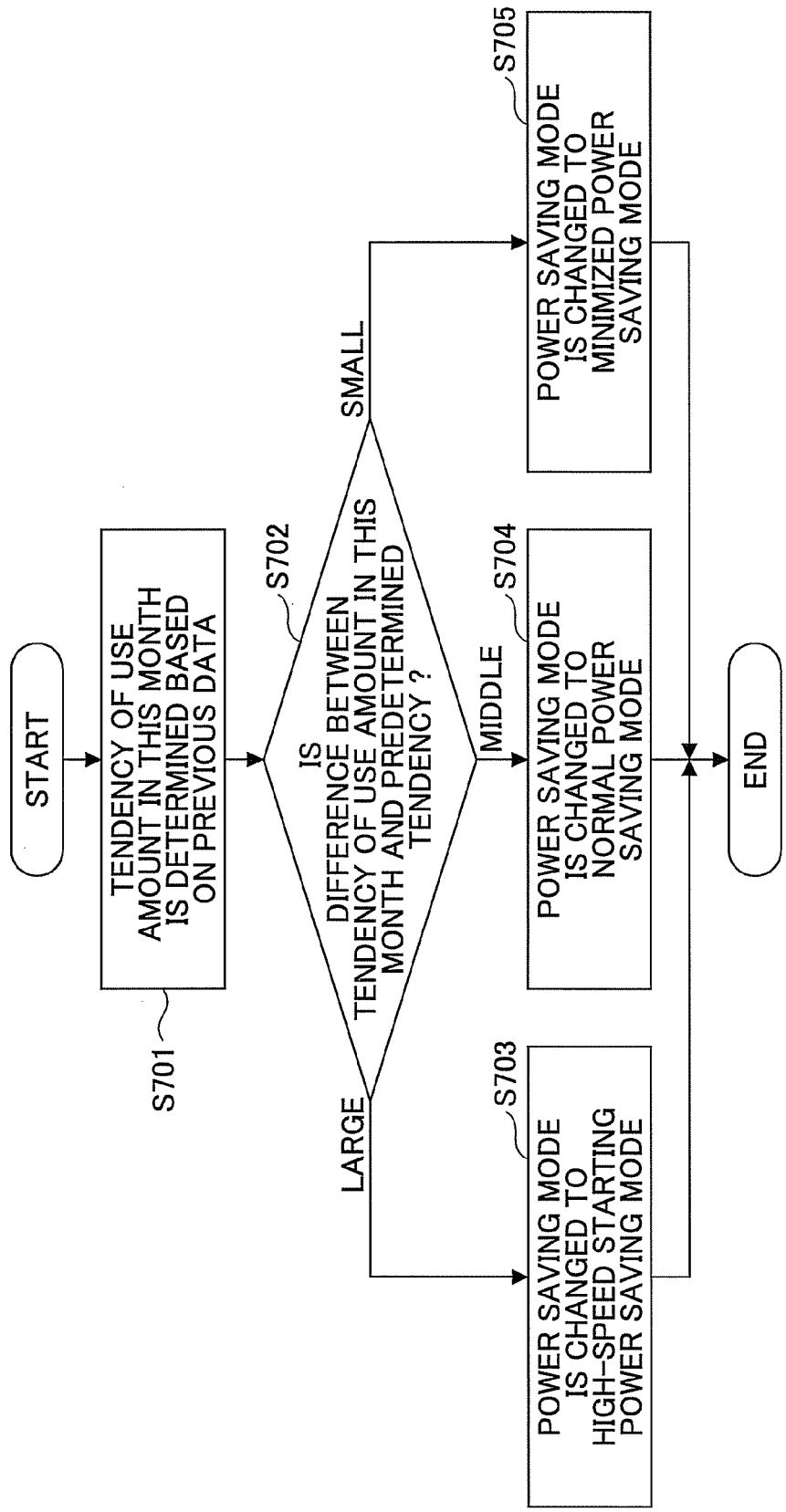
FIG. 14 is a flowchart for explaining an operation control process performed by the information processing device of the fourth embodiment to change the power saving mode.

FIGS. 12-14 are diagrams for explaining a fourth embodiment of the present disclosure. FIGS. 12-14 are flowcharts for explaining operation control processes which change the power saving mode based on the use amount of the previous data, respectively.

The information processing device of this embodiment is constituted by the image forming device 1 of the first embodiment. In this embodiment, the elements which are the same as corresponding elements in the first embodiment are designated by the same reference numerals, and a description thereof will be omitted.

The image forming device 1 of this embodiment computes the amount of predicted power consumption at the end of the consumption period from the processing of a requested operation from the user, which consumption period is defined beforehand for each predetermined consumption period by the user (for example, on a monthly basis), and chooses one of a plurality of power saving modes based on the amount of predicted power consumption. The plurality of power saving modes include a high-speed starting power saving mode in which the power consumption is comparatively large but the startup of the image forming device 1 is quick, a normal power saving mode in which the startup speed is normal and the latency time from the standby mode to the power saving mode is normal, and a minimized power saving mode in which the startup speed is low, the latency time from the standby mode to the power saving mode is comparatively short but the power consumption is minimized. The operation control process is performed based on the selected one of the plurality of power saving modes based on the amount of predicted power consumption.

Similar to the image forming device 1 of the first embodiment, as shown in FIG. 5, in the image forming device 1 of this embodiment, if the requested operation is performed in response to the operation request from the user, the control unit 2 counts the execution operation amount in each of the copy mode, the print mode, the scan mode, and the scan-to-folder mode (the number of copies executed), computes the cumulative total of each daily execution operation amount (the number of copies executed) in each mode, and further computes the total of the execution operation amounts of all the modes of the month (the total number of copies executed) and stores the same in the memory unit.

In the flowchart of FIG. 12, the control unit 2 computes at proper timing the approximated curve of the predicted use amount of this month as shown in FIG. 8, based on the use amount of this month stored in the memory unit 5 (step S501). The amount of predicted power consumption at the end time of this month is computed based on the approximated curve (step S502). It is detected how much the amount of predicted power consumption is larger than the budget amount of this month (the allowable use amount) (step S503).

When it is detected in the step S503 that the difference between the budget amount and the amount of predicted power consumption is larger than the predefined large reference difference (i.e., when the amount of predicted power consumption is much smaller than the budget amount), the control unit 2 changes the power saving mode to the high-speed starting power saving mode (step S504).

When it is detected in the step S503 that the difference between the budget amount and the amount of predicted power consumption is between the large reference difference and the small reference difference which are defined beforehand (i.e., when the difference between the budget amount and the amount of predicted power consumption is in the middle), the control unit 2 changes the power saving mode to the normal power saving mode (step S505).

When it is detected in the step S503 that the difference between the budget amount and the amount of predicted power consumption is smaller than the small reference difference define beforehand (i.e., when the amount of predicted power consumption is close to the budget), the control unit 2 changes the power saving mode to the minimized power saving mode (step S506).

In the operation control process which changes the power saving mode, based on the consumption period of the past as shown in FIG. 10, the amount of predicted power consumption at the end of the consumption period may be computed. Alternatively, the amount of predicted power consumption at the end of this month may be computed based on the total use amount by last month, and the power saving mode may be changed based on the difference between the amount of predicted power consumption and the budget amount. In this case, the control unit 2 computes the total use amount on a daily basis and stores the same in the memory unit 5, and the control unit 2 counts the use amount of this month for each mode and stores the same in the memory unit 5 as mentioned above.

The control unit 2 acquires the daily total use amount each month, and as shown in FIG. 10, it stores the same in the memory unit 5.

In the flowchart of FIG. 13, the control unit 2 computes at proper timing the amount of predicted power consumption at the end of this month based on the daily total use amount of this month and the daily total use amount of last month stored in the memory unit 5 (step S601). The control unit 2 detects how much the difference between the amount of predicted power consumption and the budget amount of this month (the allowable use amount) is (step S602).

When it is detected in the step S602 that the difference between the budget amount and the amount of predicted power consumption is larger than the predefined large reference difference, the control unit 2 changes the power saving mode to the high-speed starting power saving mode (step S603).

When it is detected in the step S602 that the difference between the budget amount and the amount of predicted power consumption is between the predefined large reference difference and the predefined small reference difference, the control unit 2 changes the power saving mode to the normal power saving mode (step S604).

When it is detected in the step S602 that the difference between the budget amount and the amount of predicted power consumption is smaller than the predefined small reference difference, the control unit 2 changes the power saving mode to the minimized power saving mode (step S605).

Therefore, the power consumption can be reduced in a planned manner with good availability.

Alternatively, the operation control process which changes the power saving mode may be performed based on the total use amount (or the average use amount) of the past consumption periods as shown in FIG. 10.

In the flowchart of FIG. 14, the control unit 2 analyzes at proper timing the tendency of the use amount within this month based on the use amount of this month and the total of the daily use amounts of two or more past months prior to this month both stored in the memory unit (step S701).

Subsequently, the control unit 2 detects how much the difference between the tendency of the use amount of the consumption period and the predefined reference tendency is (step S702). The predefined reference tendency includes a large reference tendency, a middle reference tendency, and a small reference tendency which are predefined.

When it is detected in the step S702 that the tendency of the use amount is larger than the predefined large reference tendency, the control unit 2 changes the power saving mode to the high-speed starting power saving mode (step S703).

When it is detected in the step S702 that when the tendency of the use amount is between the predefined large reference tendency and the predefined small reference tendency, the control unit 2 changes the power saving mode to the normal power saving mode (step S704).

When it is detected in the step S702 that the tendency of the use amount is smaller than the predefined small reference tendency, the control unit 2 changes the power saving mode to the minimized power saving mode (step S705).

As described above, one of the plurality of power saving modes is selected based on the tendency of the use amount, and the power saving mode is changed to the selected power saving mode. Therefore, it is possible to reduce the power consumption in a planned manner with good availability.

Fifth Embodiment

Figure 15:
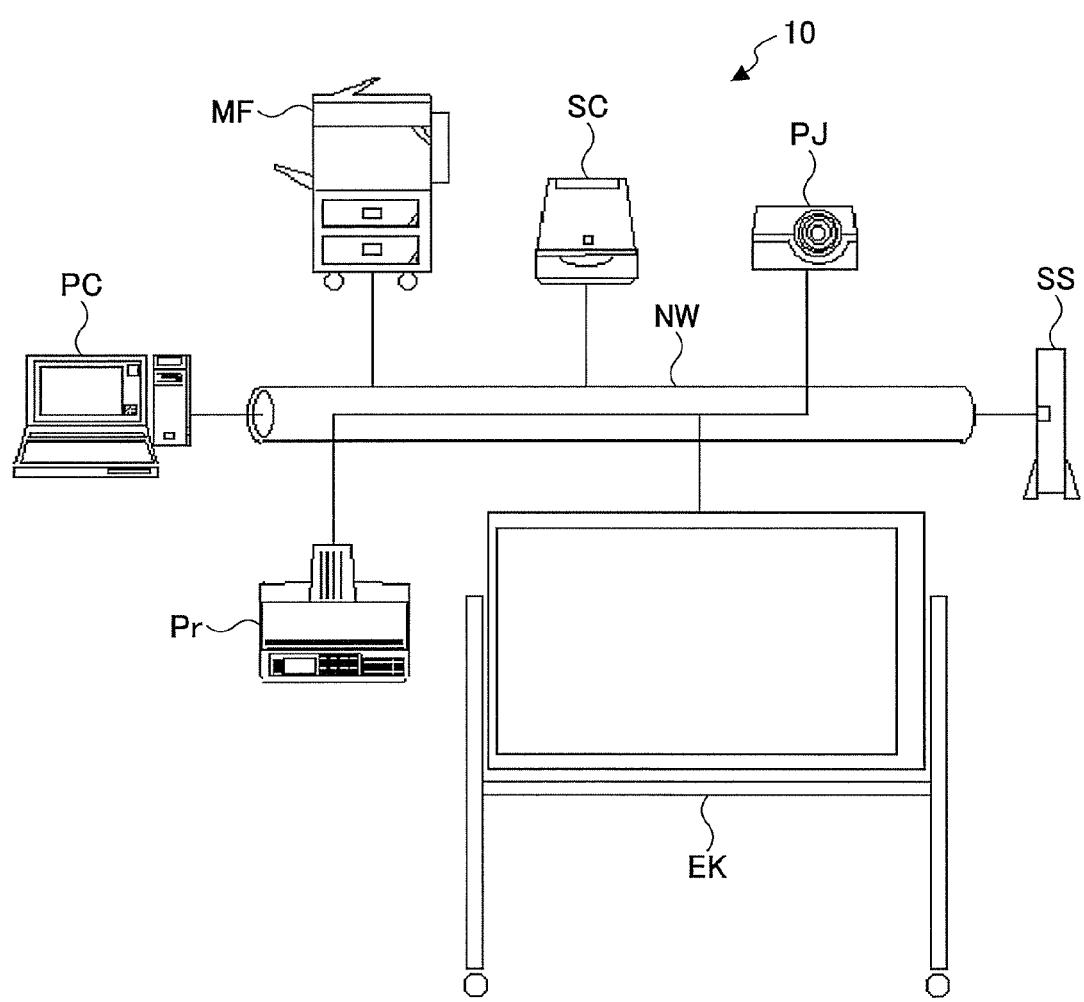
FIG. 15 is a diagram showing the composition of a network system of a fifth embodiment of the present disclosure.

FIGS. 15-20 are diagrams for explaining a fifth embodiment of the present disclosure. FIG. 15 is a block diagram of a network system 10 of the fifth embodiment. As illustrated in FIG. 15, the network system 10 includes a plurality of network devices and a power saving control device SS which are connected to a network NW, such as a LAN (local area network) using the Ethernet (registered trademark). The network devices may include a personal computer PC, a multi-function peripheral MFP, a network scanner SC, a projector PJ, a personal printer Pr, and an electronic copyboard EK. The kinds of the network devices and the number of the network devices are not limited to those illustrated in this embodiment.

In the following, any of the computer PC, the multi-function peripheral MFP, the network scanner SC, the projector PJ, the personal printer Pr, and the electronic copyboard EK may be collectively referred to as a network device.

The computer PC is constituted by a personal computer with the normal hardware and software configuration used. The computer PC includes a power monitoring unit (not shown) which has a mode needed to perform the power-saving control method of the present disclosure, monitors the power consumption used in operation in the mode, and supplies to the power saving control device SS the monitored result.

The multi-function peripheral MFP has a plurality of functions, including a scanner function which reads the image of a color document, a printer function which performs the printing output of a color image to a recording sheet based on the color image data, a facsimile function which performs facsimile communication of the image data. The MFP includes a power monitoring unit (not shown) which has a mode needed to perform the power-saving control method of the present disclosure, monitors the power consumption used in operation in the mode, and supplies to the power saving control device SS the monitored result.

The scanner SC reads the image of a color document and outputs the image to the computer PC, etc. The scanner SC includes a power monitoring unit (not shown) which has a mode needed to perform the power-saving control method of the present disclosure, monitors the power consumption used in operation in the mode, and supplies to the power saving control device SS the monitored result.

The projector PJ projects an mage based on the input data. The projector PJ includes a power monitoring unit (not shown) which has a mode needed to perform the power-saving control method of the present disclosure, monitors the power consumption used in operation in the mode, and supplies to the power saving control device SS the monitored result.

The personal printer Pr performs the printing output of a color image to a recording sheet according to a predetermined printing method, such as an ink jet method or an electrophotographic method, based on the image data sent from the computer PC or the multi-function peripheral MFP via the network NW. The printer Pr includes a power monitoring unit (not shown) which has a mode needed to perform the power-saving control method of the present disclosure, monitors the power consumption used in operation in the mode, and supplies to the power saving control device SS the monitored result.

The electronic copyboard EK stores digital data of characters or images indicated on the surface of a board in a memory, performs the printing output of the digital data to any of the computer PC, the multi-function peripheral MFP and the personal printer Pr via the network NW, and receives image data from any of the scanner SC, the multi-function peripheral MFP and the computer PC, and displays the image on the surface of the board. The electronic copyboard EK includes a power monitoring unit (not shown) which has a mode needed to perform the power-saving control method of the present disclosure, monitors the power consumption used in operation in the mode, and supplies to the power saving control device SS the monitored result.

The power saving control device SS is constituted by a computer or a server with the normal hardware and software configuration used. The power saving control device SS includes a memory unit which stores various data required to execute the power-saving control program for performing the power-saving control method of the present disclosure. The power saving control device SS includes a recording medium, such as a ROM, an EEPROM, an EPROM, a flash memory, a flexible disk, a CD-ROM, a CD-RW, a DVD, an SD card, or an MO. The power-saving control program for performing the power-saving control method of the present disclosure stored in the recording medium is read and loaded to the memory of the computer, and the power saving control device SS is constructed. The power saving control device SS performs the power-saving control method which controls operation of each network device in the range of the power consumption intended by the user.

The power-saving control program is a computer-executable program which is described in legacy programming languages, such as assembler, C, C++, C#, and Java (registered trademark), an object-oriented programming language, etc. and can be stored in a recording medium and distributed to a device through the recording medium.

As described above, each of the network devices includes the power monitoring unit (or the consumed-electric-power monitoring unit) which monitors the power consumption used by execution of the functional operation, and the consumed-electric-power providing unit which supplies the monitored power consumption to the power saving control device SS. In each network device, execution of the functional operation is controlled by the power saving control device SS, and the shifting of the power saving mode to one of the plurality of power saving modes provided therein is also controlled by the power saving control device SS.

In the power saving control device SS, the power-saving control program and various data needed for executing the power-saving control program are stored in the memory unit. By executing the power-saving control program read from the memory unit, the power saving control device SS performs the power saving control. By executing the program, in the power saving control device SS, the allowable consumed-electric-power setting unit is configured to define a consumption period and an allowable consumed electric power permitted within the consumption period in the network system 10. Moreover, the electric power collecting unit is configured to communicate with each network device via the network NW and collect the consumed electric power of the monitored result of each network device from the power monitoring unit. Moreover, the power-saving control unit is configured to control operation of each network device based on the consumed electric power of each network device collected by the electric power collecting unit.

In the memory unit of the power saving control device SS, the function, the performance, the power consumption, and the cost of each network device which is connected to the network NW and constitutes the network system 10 are registered as a standard power consumption table. For example, an alternative-device information table Tb11 in a case of print operation as shown in FIG. 16 is stored in the memory unit, and the information on the alternative network devices for each functional operation is stored in this table.

Specifically, in the alternative-device information table Tb11 of FIG. 16, the information on the alternative network device as an alternative to the print operation, the power consumption when performing the fundamental processing (print operation of five sheets; ten copies) by the alternative network device, the cost, the function, and the performance is registered. As the network devices, the high-speed MFP, the MFP, the network scanner SC, the electronic copyboard EK, and the projector PJ are registered.

In the power saving control device SS, if the power consumption budget as the allowable consumed electric power for each predefined consumption period in the network system 10 is input beforehand by a user (or administrator) of the network system 10 from the input unit, the budget is stored in the memory unit, operation of each network device is controlled so that the consumed electric power in the consumption period collected from each device is controlled to be within the limit of the budget, and an alternative network device is chosen.

Next, the operation of this embodiment will be described.

The network system 10 of this embodiment performs an operation control of a requested operation to be within the limit of the power consumption budget which is the allowable consumed electric power defined beforehand for each predefined consumption period by the user (administrator).

The user of the network system 10 inputs the electric power which uses network system 10 in each predetermined period on a monthly basis, etc. The standard power consumption table for each functional operation of each device beforehand stored in the memory unit if a setting input is carried out using the outputting part and input unit of the power saving control device SS and the setting input of the electric power which can be used is carried out as for the power saving control device SS (which is the same as that of FIG. 2). It is a standard power consumption table for each functional operation for each device. It registers with the same amount table as the allowable use amount table Tb2 as computed the amounts (for example, the number of copies) for each device in the set-up consumption period (for example, on a monthly basis) which can be used, for example, shown in FIG. 3 that can be used, and the memory unit is made to store.

The power saving control device SS registers into the memory unit the allowable use amount table for each functional operation of each network device.

Figure 17:
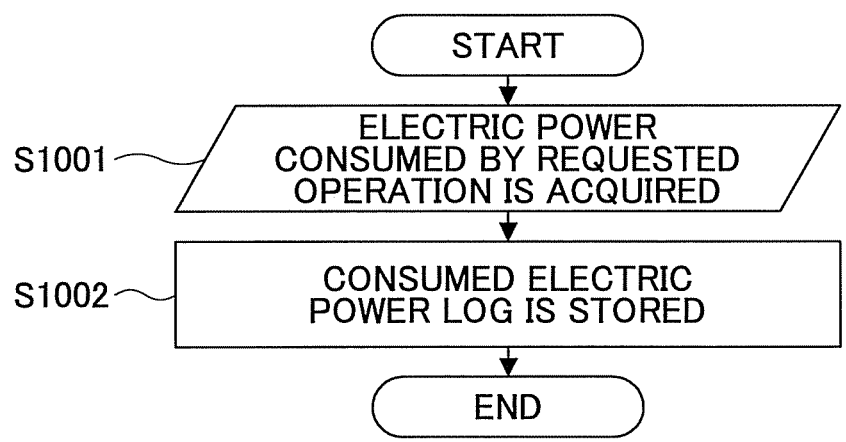
FIG. 17 is a flowchart for explaining a power consumption collecting process of the fifth embodiment.

As shown in FIG. 17, when an operation request is received from a user and each network device performs the requested functional operation, the power monitoring unit acquires the electric power consumed by execution of the functional operation (step S1001).

The consumed electric power acquired by the power monitoring unit is transmitted to the power saving control device SS via the network NW. Or in response to a request from the power saving control device SS, the power consumption is transmitted thereto. In the memory unit of the power saving control device SS, the amount of the electric power used (consumed-electric-power log) corresponding to the functional operation of each network device, and the total use amount (consumed-electric-power total log) are stored (step S1002).

Figure 18:
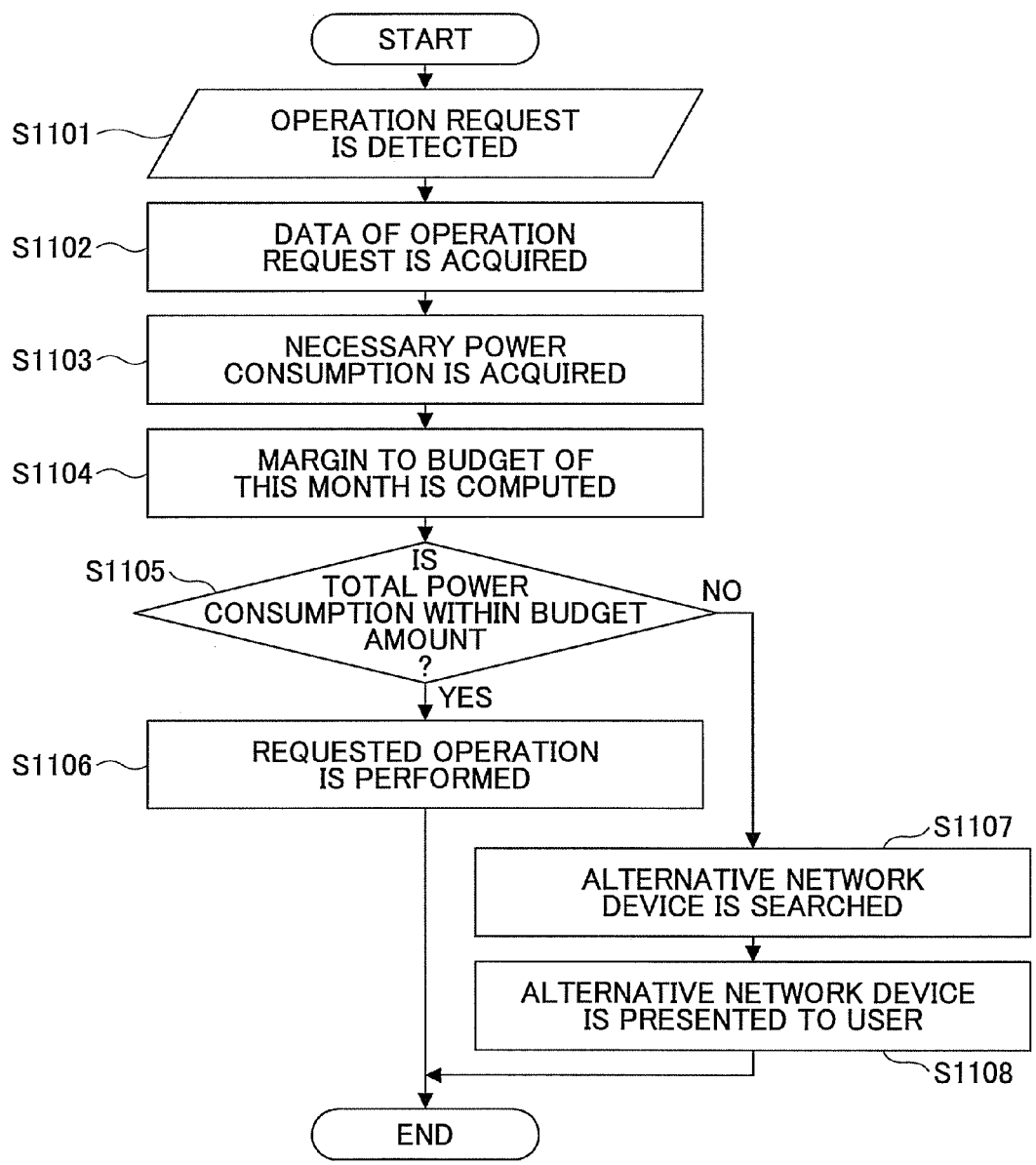
FIG. 18 is a flowchart for explaining a power-saving control process of the fifth embodiment.
Figure 19:
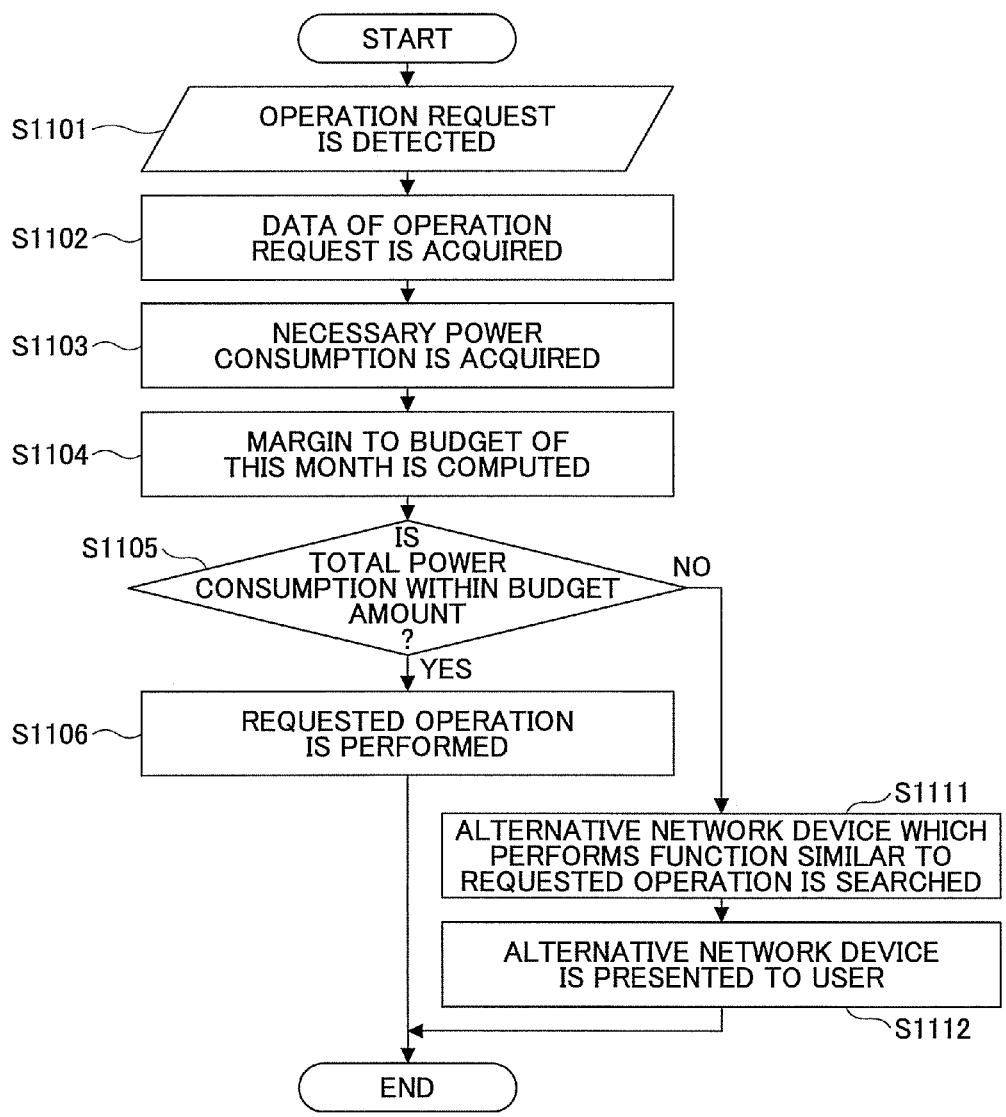
FIG. 19 is a flowchart for explaining another power-saving control process of the fifth embodiment.

When the user sends an operation request to the network device, such as the multi-function peripheral MFP on the network NW, the power saving control device SS performs the device operation control process as shown in FIG. 18 or 19 based on the content of the operation request and the allowable electric power within the consumption period.

In the flowchart of FIG. 18, if an operation request, such as a printing request, from a user to one network device on the network NW is detected (step S1101), the power saving control device SS acquires the content of the operation request to the network device by receiving a notification from the network device (step S1102). The power saving control device SS acquires the required electric power to perform the requested operation from the data of the network device of the standard power consumption table (step S1103).

The power saving control device SS computes the total consumed electric power which is obtained by adding the required consumed electric power to the consumed-electric-power log related information which is the consumed electric power by the consumption period. The power saving control device SS computes the difference (margin) between the total consumed electric power and the allowable consumed electric power (budget amount) (step S1104).

It is determined whether the total power consumption by execution of the requested functional operation of the network device is within the limit of the budget amount (step S1105).

When it is determined in the step S1105 that the total power consumption is within the limit of the budget amount, the power saving control device SS allows execution of the requested functional operation of the network device, and the network device performs the requested functional operation (step S1106).

When it is determined in the step S1105 that the total power consumption is not within the limit of the budget amount, the power saving control device SS accesses the alternative-device information table Tb11 shown in FIG. 16 and searches an alternative network device that performs the requested functional operation or a similar functional operation (step S1107).

Subsequently, the power saving control device SS presents a notification indicating that the budget amount of the consumed electric power is exceeded if the operation is performed and indicating of the alternative network device of the search result with little power consumption, to the user (step S1108). Then, the control process is terminated.

In the case of FIG. 16, if the requested operation is the print operation of the multi-function peripheral MFP, the alternative network device searched for this example may be the personal printer Pr.

When another device which performs a functional operation that is the same as the requested functional operation, without exceeding the limit of the budget amount cannot be chosen as an alternative network device, the power saving control device SS may choose an alternative network device which performs a similar functional operation instead of the requested functional operation as shown in FIG. 19. In FIG. 19, the elements which are the same as corresponding elements in FIG. 18 are designated by the same reference numerals.

In the flowchart of FIG. 19, if an operation request, such as a printing request, from a user to one network on the network NW is detected (step S1101), the power saving control device SS acquires the content of the operation request to the network device (step S1102), and computes the required electric power from the data of the device of the standard power consumption table to the operation request (step S1103).

The power saving control device SS computes the difference (margin) between the budget amount and the total consumed electric power which is obtained by adding the consumed electric power to the required consumed electric power by the consumption period (step S1104).

It is determined whether the total power consumption by execution of the requested functional operation of the network device is within the limit of the budget amount (step S1105).

When it is determined in the step S1105 that the total power consumption is within the limit of the budget amount if the requested functional operation is performed, the power saving control device SS allows execution of the requested functional operation of the network device, and the network device performs the requested functional operation (step S1106).

When it is determined in the step S1105 that the total power consumption is not within the limit of the budget amount if the requested functional operation is performed, the power saving control device SS accesses the alternative-device information table Tb11 shown in FIG. 16, and searches an alternative network device that performs a functional operation which is not the same as the requested functional operation but performs a similar functional operation (step S1111).

Subsequently, the power saving control device SS presents a notification indicating that the budget amount of the consumed electric power is exceeded if the requested functional operation is performed, and indicating of the alternative network device of the search result with little power consumption which performs a similar functional operation instead of the network device, to the user (step S1112). Then, the control process is terminated.

In the case of FIG. 16, if the operation request is a print operation, the alternative network device to be searched may be changed to a network device having the same functional operation that changes to the print operation instead of the print operation as a function. For example, another network device having a display with less power consumption which performs a similar functional operation without exceeding the limit of the budget amount, instead of performing the requested functional operation by the network device, may be searched from the alternative-device information table Tb11 shown in FIG. 16.

For example, in the case of FIG. 16, the electronic copyboard EK is chosen as an alternative network device when the operation request is the print operation of the multi-function peripheral MFP.

In the network system 10 of this embodiment, after the functional operation is performed in each requested device, the consumed electric power consumed by execution of the functional operation of each device is monitored by the power monitoring unit of the device. The power saving control device SS collects the consumed electric power of each device by prescribed timing. If a consumption period (for example, one month) and the allowable consumed electric power permitted within the consumption period are defined, the consumed-electric-power total log which totaled the consumed-electric-power log and consumed-electric-power log of consumed electric power at intervals of a predetermined time collected from each device are computed, and the memory unit is made to store the as consumed-electric-power log related information.

If the functional operation occurs in the device at the specified period within the consumption period, based on whether the total consumed electric power which added required consumed electric power required to perform request operation to the consumed-electric-power log related information which the memory unit by a specified period stores is in a budget, execution of the requested functional operation in the requested device is controlled. Therefore, the power consumption can be reduced in a planned manner with good availability.

In the network system 10 of this embodiment, the consumed-electric-power total log related information for each functional operation of each device is stored in the memory unit for each consumption period. The difference (margin) of the total consumed electric power and the budget adding the consumed-electric-power total log and required consumed electric power in the consumption period is computed, and execution of the functional operation required of device based on the margin is controlled. Therefore, when the functional operation is performed by each device, the power consumption can be easily reduced in a planned manner with good availability.

In the network system 10 of this embodiment, the power saving control device SS stores the consumed-electric-power total log related information for each functional operation of each device in the memory unit for each consumption period. The difference (margin) of the total consumed electric power and the budget adding the consumed-electric-power total log and required consumed electric power in the consumption period is computed, and the alternative network device of low power which performs the same functional operation is chosen based on the margin. Therefore, the power consumption of the overall network NW can be reduced in a planned manner, and the availability of the user using the device of the network NW can be raised.

In the network system 10 of this embodiment, the power saving control device SS stores the consumed-electric-power total log related information for each functional operation of each device in the memory unit for each consumption period, computes the difference (margin) of the total consumed electric power and the budget adding the consumed-electric-power total log and required consumed electric power in the consumption period based on the margin, and selects as the requested operation the alternative network device of low power which performs the same operation. Therefore, the power consumption of the overall network NW can be reduced in a planned manner, and the availability of the user using the device of the network NW can be raised.

If the power saving control device SS determines that the requested functional operation by the device cannot be performed, the network system 10 of this embodiment outputs a notification indicating refusal of the request to the user of the device. Therefore, the user of the device in the network system 10 can grasp the power consumption situation, and the power consumption can be reduced in a planner manner with good availability.

Figure 20:
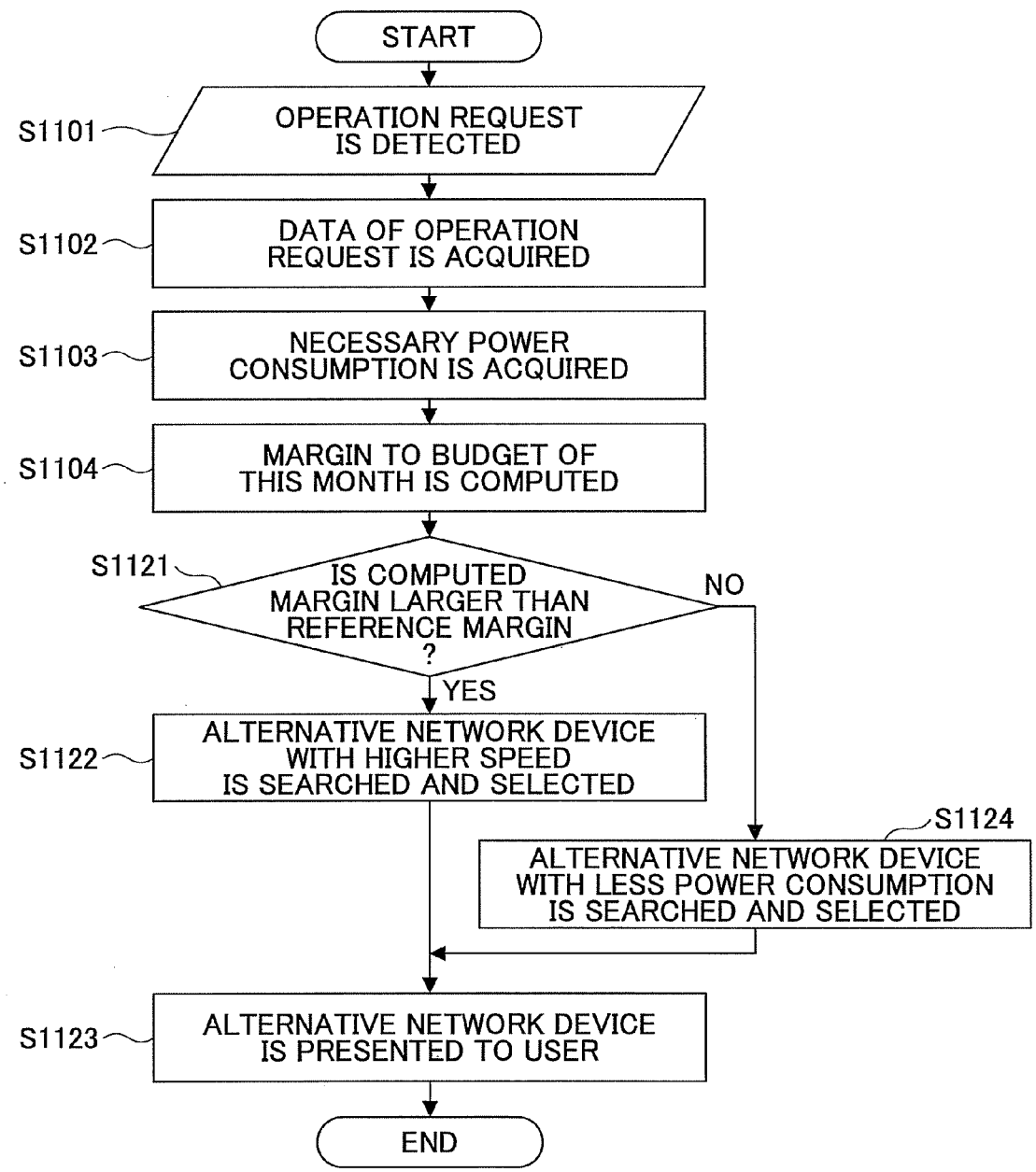
FIG. 20 is a flowchart for explaining a power-saving control process which chooses an alternative network device based on the margin to the budget of the fifth embodiment.

Alternatively, the selection of an alternative network device may be made according to the size of the difference (margin) between the budget amount and the current consumed-electric-power total log by the consumption period, as shown in FIG. 20. In FIG. 20, the elements which are the same as corresponding elements in FIG. 18 are designated by the same reference numerals, and a description thereof will be omitted.

In this case, the power saving control device SS has operation requests, such as a printing request, from a user to one on the network NW of device, as shown in FIG. 20 (step S1101).

The operation request to the device is acquired (step S1102), and the required consumed electric power is acquired from the data of the device of the standard power consumption table to the operation request (step S1103).

The power saving control device SS computes the difference (margin) of the total consumed electric power and the budget which added required consumed electric power to the consumed electric power by the consumption period (step S1104).

It is determined whether the size of the margin to the budget of this month is larger than the margin defined beforehand (step S1121).

In the step S1121, when a margin is larger than a setting margin, the power saving control device SS chooses high-speed device as an alternative network device rather than performing functional operation of the requested device, and the same functional operation by accessing the alternative-device information table Tb11 shown in FIG. 16 (step S1122).

For example, when the personal printer Pr is the device for which the operation request is received, the multi-function peripheral MFP which is the same function and operates at a higher speed is chosen.

After the alternative network device is chosen, the power saving control device SS outputs the notification of the high-speed device to the user (step S1123). Then, the operation control process is terminated.

If the functional operation required of the device by which the margin is smaller than the setting margin, or the operation request is carried out in step S1121 is performed, when not being settled in the budget, although the power saving control device SS performs the functional operation and these requirements which are requested, or same operation by accessing the alternative-device information table Tb11 shown in FIG. 16, it chooses the alternative network device of low power which performs operation which is not the same (step S1124).

Subsequently, the power saving control device SS outputs the notification including the presence of a small margin or the excess of the budget amount and the selection of the low-power device, to the user (step S1123). Then, the operation control process is terminated.

Sixth Embodiment

Figure 21:
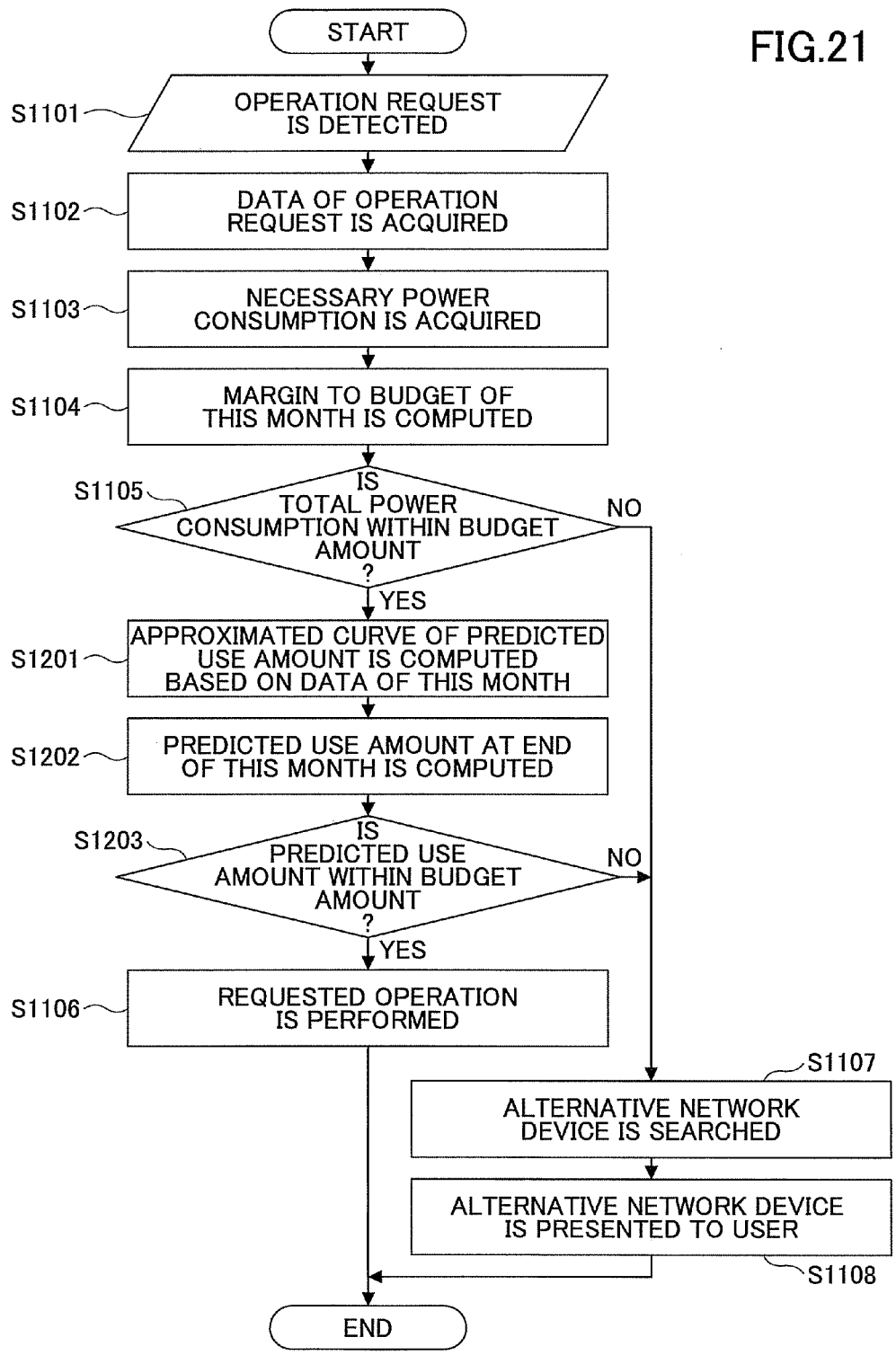
FIG. 21 is a flowchart for explaining a power-saving control process performed by a network system of a sixth embodiment of the present disclosure.
Figure 22:
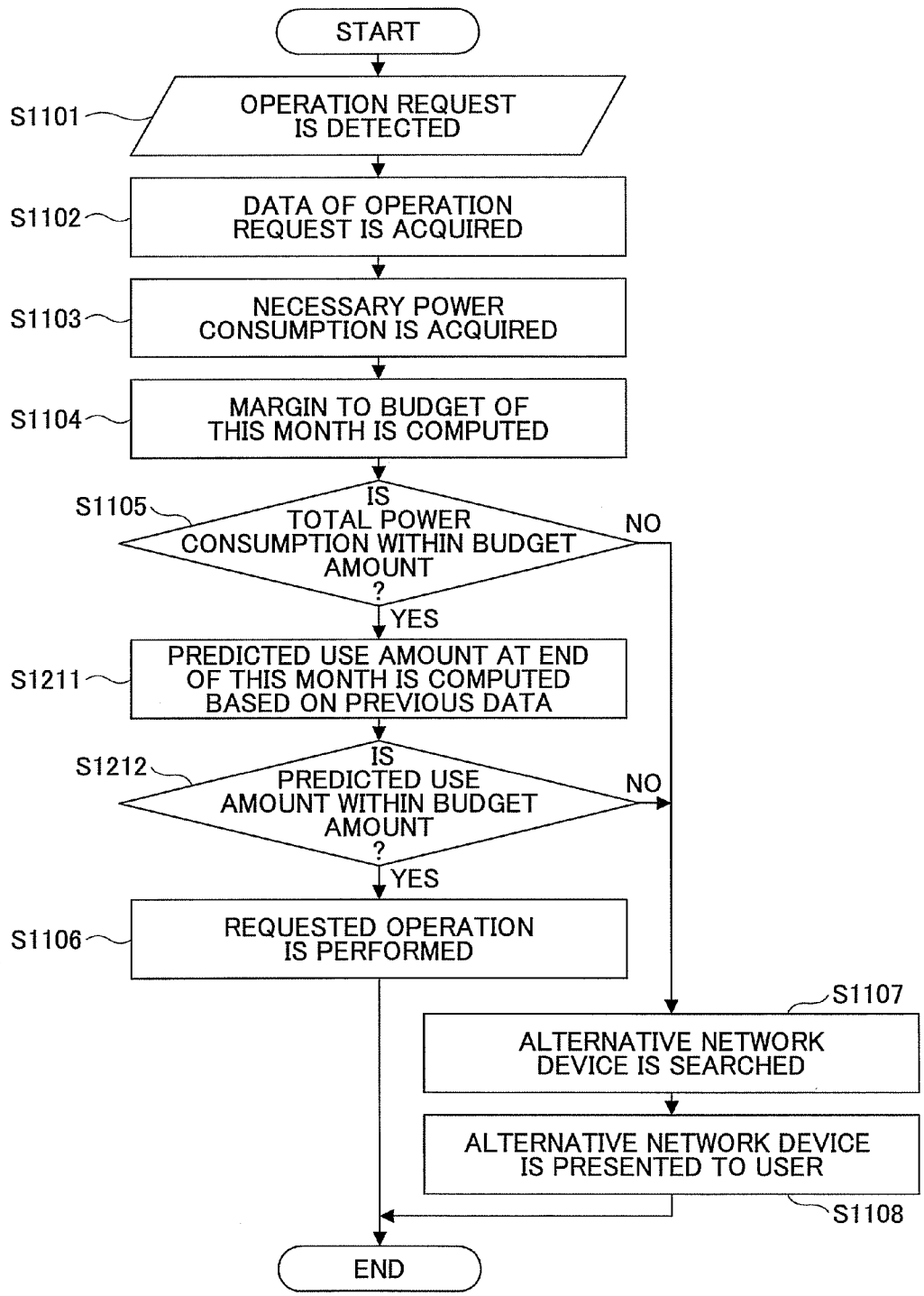
FIG. 22 is a flowchart for explaining a power-saving control process performed by the network system of the sixth embodiment.

FIG. 21 and FIG. 22 are diagrams for explaining a sixth embodiment of the present disclosure. FIG. 21 is a flowchart for explaining a power-saving control process of this embodiment and FIG. 22 is a flowchart for explaining another power-saving control process of this embodiment.

In this embodiment, it is determined whether the operation requested in the consumption period can be performed to be within the limit of the power consumption budget (allowable consumed electric power) which is defined beforehand for each predefined consumption period by the user (administrator), and the operation control processing of the requested device is performed.

As shown in FIG. 21, if an operation request to a network device is received, the power saving control device SS performs the power-saving control process. In FIG. 21, the elements which are the same as corresponding elements in FIG. 18 are designated by the same reference numerals, and a description thereof will be omitted.

If an operation request, such as a printing request, to one network device on the network NW is received from a user (step S1101), the power saving control device SS acquires the operation request to the device (step S1102), and the required electric power (power consumption information) is acquired from the data of the device of a standard power consumption table to the operation request (step S1103).

The power saving control device SS computes the difference (margin) between the total consumed electric power to which the required consumed electric power to the consumed electric power by the consumption period is added and the allowable consumed electric power (budget) (step S1104).

It is determined whether the total power consumption by execution of the requested functional operation of the network device is within the limit of the budget amount (step S1105).

When it is determined in the step S1105 that the total power consumption is within the limit of the budget amount, the power saving control device SS computes the approximated curve of the predicted use amount of this month as shown in FIG. 8 based on the power consumption of the past months (step S1201).

The amount of predicted power consumption (prediction consumption power) at the end of this month (or the end of the consumption period) is computed based on the approximated curve (step S1202), and it is determined whether the amount of predicted power consumption is within the limit of the budget amount of this month (step S1203).

When it is determined in the step S1203 that the amount of predicted power consumption at the end of this month is within the limit of the budget amount, the requested functional operation is performed (step S1106). Then, the control process is terminated.

When it is determined in the step S1203 that the amount of predicted power consumption exceeds the limit of the budget amount of this month, the power saving control device SS searches another network device that performs the requested functional operation or another network device that performs a similar functional operation, by accessing the alternative-device information table Tb11 shown in FIG. 16 (step S1107).

Subsequently, the power saving control device SS presents a notification indicating that the budget amount of the consumed electric power is exceeded and indicating of the alternative network device of the search result which performs the same or similar functional operation, to the user (step S1108). Then, the control process is terminated.

When it is determined in the step S1105 that the total power consumption is not within the limit of the budget amount, the power saving control device SS searches another network device that performs the requested functional operation or another network device that performs a similar functional operation, by accessing the alternative-device information table Tb11 shown in FIG. 16 (step S1107).

Subsequently, the power saving control device SS presents a notification indicating that the budget amount of the consumed electric power is exceeded and indicating of the alternative network device of the search result which performs the same or similar functional operation, to the user (step S1108). Then, the control process is terminated.

Alternatively, as shown in FIG. 22, a predicted power consumption within the consumption period (at the end of the month) may be computed based on the average of the past power consumption data. In FIG. 22, the elements which are the same as corresponding elements in FIG. 18 are designated by the same reference numerals, and a description thereof will be omitted.

In the flowchart of FIG. 22, an operation request, such as a printing request, from a user to one network device on the network NW is detected (step S1101). By receiving a notification from the network device, the power saving control device SS acquires the content of the operation request to the network device (step S1102). The required consumed electric power is acquired from the data of the device of the standard power consumption table to the operation request (step S1103).

The power saving control device SS computes the difference (margin) between the allowable consumed electric power (budget amount) and the total consumed electric power to which the required consumed electric power to the consumed electric power by the consumption period is added (step S1104).

It is determined whether the total power consumption when the requested functional operation indicated by the operation request is performed is within the limit of the budget amount (step S1105).

When it is determined in the step S1105 that the total power consumption is within the limit of the budget amount if the requested functional operation is performed, the power saving control device SS computes the amount of a predicted power consumption at the end of the month based on the average of the amount of the total power consumption of the past months stored in the memory unit (step S1211). Then, it is determined whether the amount of predicted power consumption is within the limit of the budget of the month (the allowable use amount) (step S1212).

When it is determined in the step S1212 that the amount of predicted power consumption at the end of the month is within the limit of the budget amount, the power saving control device SS allows the requested functional operation of the device to be performed (step S1106). Then, the operation control process is terminated.

When it is determined in the step S1212 that the amount of predicted power consumption at the end of the month exceeds the budget amount, or when it is determined in the step S1105 that the budget amount is exceeded if the requested operation is performed, the power saving control device SS accesses the alternative-device information table Tb11 shown in FIG. 16 and searches an alternative network device which performs the requested functional operation or a similar functional operation (step S1107).

The notification indicating that the budget amount will be exceeded if the requested operation is performed and the alternative network device which performs the same or similar functional operation is presented is sent to the user (step S1108). Then, the operation control process is terminated.

Therefore, the consumed electric power of the consumption period can be predicted accurately, the control of execution of a requested operation and the presentation of an alternative network device can be performed, and the power consumption can be reduced in a planned manner with good availability.

Seventh Embodiment

Figure 23:
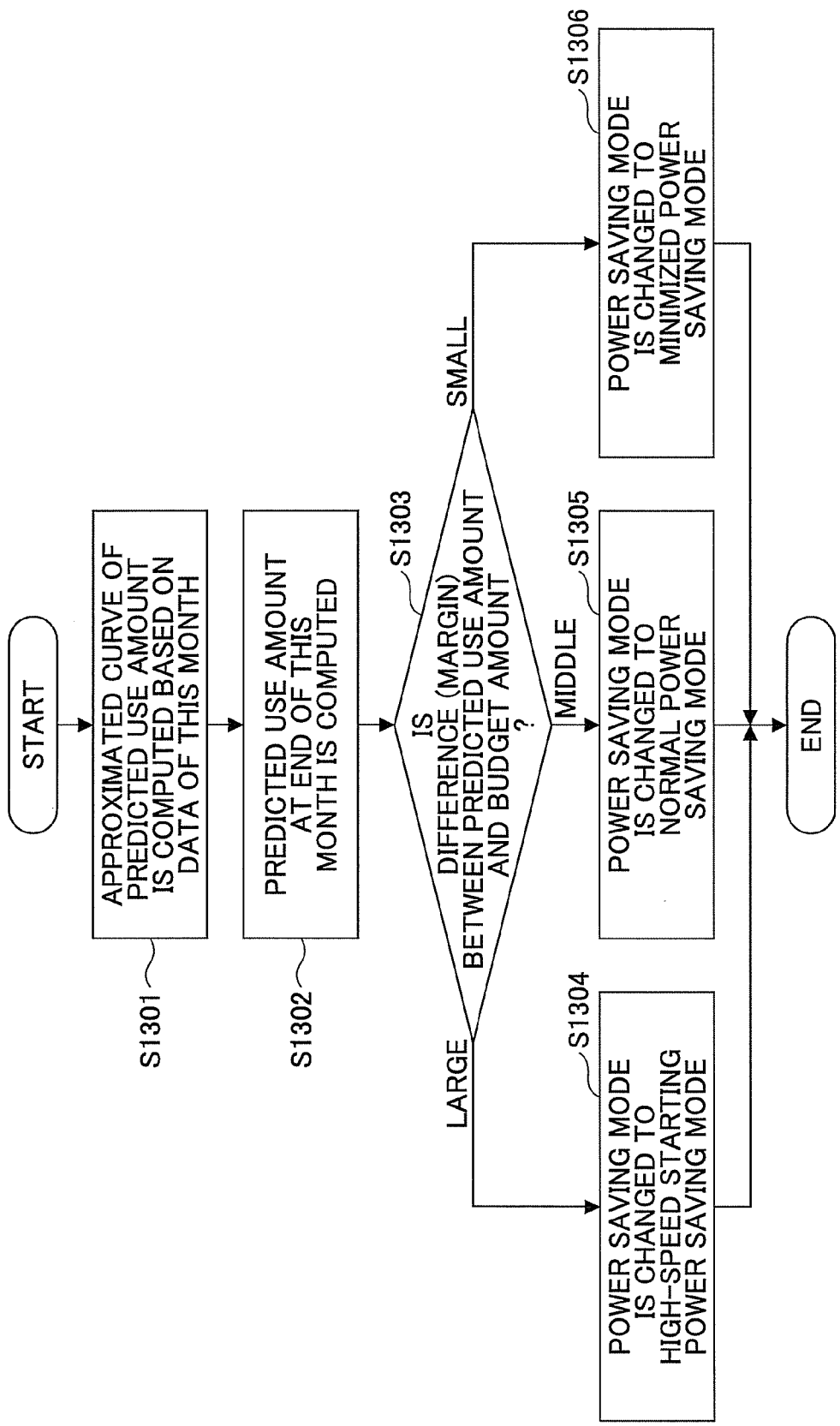
FIG. 23 is a flowchart for explaining an operation control process performed by a network system of a seventh embodiment of the present disclosure to change the power saving mode.
Figure 24:
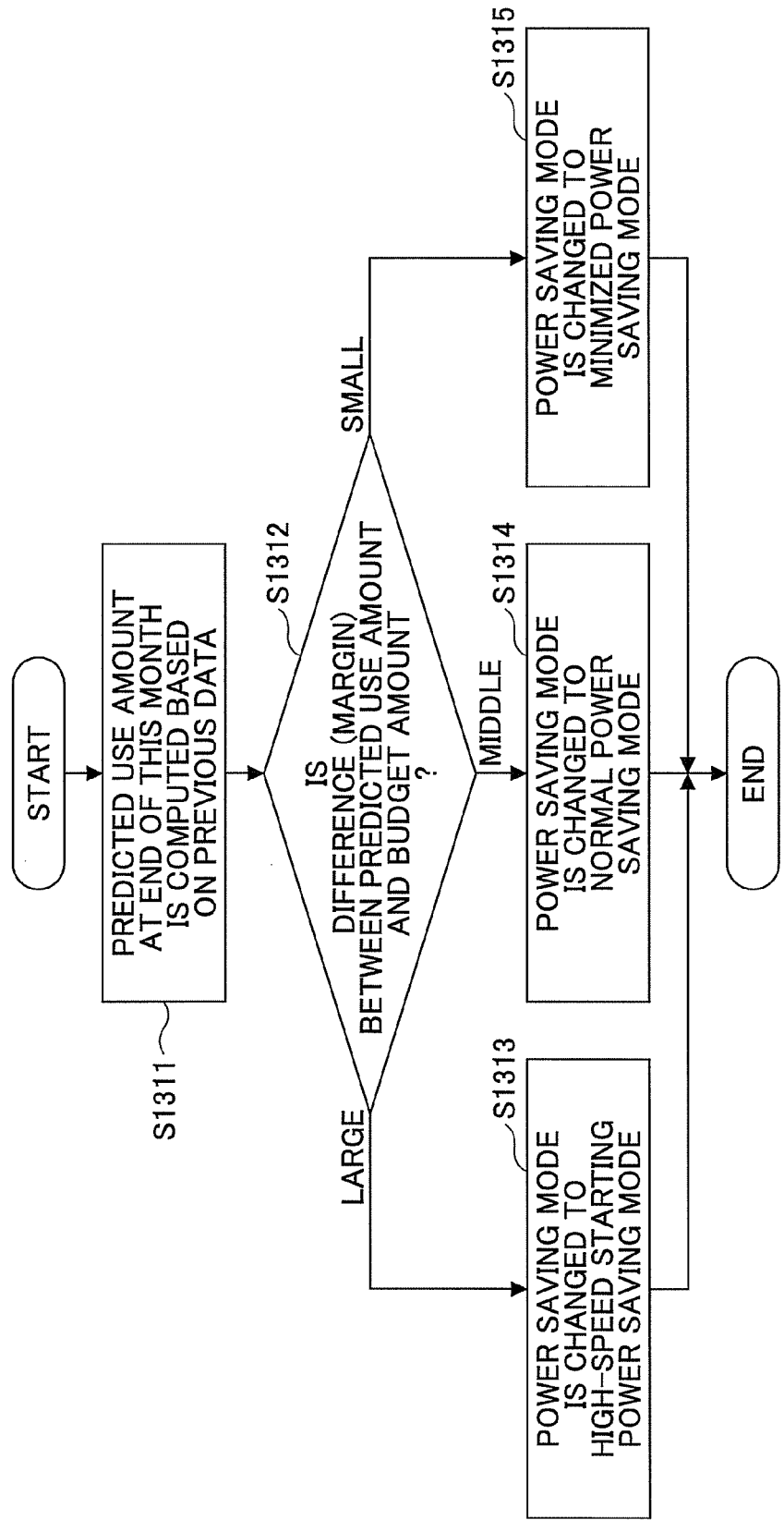
FIG. 24 is a flowchart for explaining an operation control process performed by the network system of the seventh embodiment to change the power saving mode.

FIGS. 23-25 are diagrams for explaining a seventh embodiment of the present disclosure. FIGS. 23-25 are flowcharts for explaining the power-saving control processes which change the energy saving mode of the device based on the past use amount, respectively. This embodiment is applied to the network system 10 of the fifth embodiment. In FIGS. 23-25, the elements which are the same as corresponding elements in the fifth embodiment are designated by the same reference numerals, and a description thereof will be omitted.

The network system 10 of this embodiment determines the amount of predicted power consumption at the end of a consumption period which is defined for each predetermined consumption period (for example, on a monthly basis) by the user, through the operation control processing of a requested operation from the user, and chooses one of the power saving modes of the device based on the amount of predicted power consumption.

Each device of the network system 10 of this embodiment is provided with a plurality of power saving modes including a high-speed starting power saving mode in which the startup speed to recover from the power saving mode in the high-speed starting mode is high but the power consumption is comparatively large, a normal power saving move in which the startup speed is middle and the latency time from the standby mode to the power saving mode is middle, and a minimized power saving mode in which the startup speed is low and the latency time is comparatively short. The operation control process of this embodiment is performed to choose one of the plurality of power saving modes based on the amount of predicted power consumption.

Similar to the network system 10 of the fifth embodiment, in the network system 10 of this embodiment, if each device performs the operation control process according to the request of the user, the power saving control device SS acquires the consumed electric power from the device, and as shown in FIG. 5, the power consumption of the consumption period (for example, on a monthly basis) is stored for each function (such as the copy mode, the print mode, the scan mode, and the scan-to-folder mode) and for each device.

As shown in FIG. 23, the power saving control device SS computes at proper timing the approximated curve of the predicted use amount of this month as shown in FIG. 8 based on the use amount of this month (consumption period) stored in the memory unit (step S1301). The amount of predicted power consumption at the end of this month is computed from the approximated curve (step S1302), and it is determined how much the amount of predicted power consumption is larger than the budget amount of this month (the allowable use amount), or how much the difference (margin) is (step S1303).

When it is detected in the step S1303 that the difference between the budget amount and the amount of predicted power consumption is larger than a predefined reference difference (i.e., when the amount of predicted power consumption is much smaller than the budget amount), the power saving control device SS performs the control to change the power saving mode of each device to the high-speed starting power saving mode (step S1304).

When it is detected in the step S1305 that the difference between the budget amount and the amount of predicted power consumption is between the large reference difference and the small reference difference which are defined beforehand (i.e., when the difference between the budget amount and the amount of predicted power consumption is middle), the control to change the power saving mode of each device to the normal power saving mode (step S1305).

When it is detected in the step S1305 that the difference between the budget amount and the amount of predicted power consumption is smaller than the small reference difference (i.e., when the amount of predicted power consumption is close to the budget amount), the power saving control device SS performs the control to change the power saving mode of each device to the minimized power saving mode (step S1306). This control to change the power saving mode may be performed by the power saving control device SS by transmitting a power saving mode change command to each device via the network NW.

In the flowchart of FIG. 24, the power saving control device SS computes at proper timing the amount of predicted power consumption at the end time of this month (predicted power consumption) based on the total of the daily use amounts of all the devices of last month and the total of the daily use amount of all the devices of this month stored in the memory unit (step S1311).

It is detected how much the difference (margin) between the budget amount of this month (the allowable use amount) and the amount of predicted power consumption is (step S1312).

When it is detected in the step S1312 that the difference between the budget amount and the amount of predicted power consumption is larger than the predefined large reference difference, the power saving control device SS performs the control to change the power saving mode of each device to the high-speed starting power saving mode (step S1313).

When it is detected in the step S1312 that the difference between the budget amount and the amount of predicted power consumption is between the large reference difference and the small reference difference, the control to change the power saving mode of each device to the normal power saving mode is performed (step S1314).

When it is detected in the step S1312 that the difference between the budget amount and the amount of predicted power consumption is smaller than the small reference difference, the power saving control device SS performs the control to change the power saving mode of each device to the minimized power saving mode (step S1315).

Therefore, the power consumption can be reduced in a planned manner with good availability.

In the flowchart of FIG. 25, the power saving control device SS analyzes at proper timing the tendency of the use amount within this month based on the use amount of this month and the total of the daily use amounts of two or more past months prior to this month both stored in the memory unit (step S1321). For example, in the analysis of the use amount, the power saving control device SS performs averaging processing of the daily use amount of the past data on a monthly basis.

The power saving control device SS detects how much the difference between the tendency of the use amount of the consumption period and the predefined reference tendency is (step S1322).

When it is detected in the step S1322 that the tendency of the use amount of the consumption period is larger than the predefined large reference tendency, the power saving control device SS performs the control to change the power saving mode to the high-speed starting power saving mode (step S1323).

When it is detected in the step S1322 that the tendency of the use amount of the consumption period is between the predefined large reference tendency and the predefined small reference tendency, the control to change the power saving mode to the normal power saving mode (step S1324).

When it is detected in the step S1322 that the tendency of the use amount of the consumption period is smaller than the predefined small reference tendency, the power saving control device SS performs the control to change the power saving mode to the minimized power saving mode (step S1325).

Namely, the power saving control device SS of this embodiment is arranged so that when the tendency of the use amount is small, the power saving mode of each device is changed to the minimized power saving mode, and when the tendency of use amount is large, the power saving mode of each device is changed to the high-speed starting power saving mode.

Therefore, the power consumption can be reduced in a planned manner with good availability.

As described in the foregoing, the information processing device according to the present disclosure includes an operation executing unit that executes a requested operation in one of a plurality of operating modes, a monitoring unit that monitors an electric power consumed by the execution of the requested operation by the operation executing unit, a memory unit that stores information related to the consumed electric power, a setting unit that defines a consumption period and an allowable consumed electric power within the consumption period, and a control unit that computes a consumed-electric-power log of the consumed electric power monitored by the monitoring unit at intervals of a predetermined time and a consumed-electric-power total log indicating a total of the consumed-electric-power logs and stores consumed-electric-power log related information, including the consumed-electric-power logs and the consumed-electric-power total log, in the memory unit, wherein, when an operation request is received within the consumption period, the control unit controls the execution of the requested operation by the operation executing unit based on the consumed-electric-power log related information stored in the memory unit and the allowable consumed electric power defined by the setting unit. Thus, when the information processing device is operated in one of the plurality of operating modes, the power consumption can be reduced in a planned manner with good availability.

The present disclosure is not limited to the above-described embodiments, and variations and modifications may be made without departing from the scope of the present disclosure.

The present application is based upon and claims the benefit of priority of the prior Japanese patent application No. 2010-062067, filed on Mar. 18, 2010, the content of which are incorporated herein by reference in their entirety.

What is claimed is:

1. An information processing device comprising:
an operation executing unit to execute a requested operation in one of a plurality of operating modes;
a monitoring unit to monitor an electric power consumed by the execution of the requested operation by the operation executing unit;
a memory unit to store information related to the consumed electric power;
a setting unit to define a consumption period and an allowable consumed electric power within the consumption period; and
a control unit to compute a consumed-electric-power log of the consumed electric power monitored by the monitoring unit at intervals of a predetermined time and a consumed-electric-power total log indicating a total of the consumed-electric-power logs, and store consumed-electric-power log related information, including the consumed-electric-power logs and the consumed-electric-power total log, in the memory unit,
wherein, when an operation request is received within the consumption period, the control unit controls the execution of the requested operation by the operation executing unit based on the consumed-electric-power log related information stored in the memory unit and the allowable consumed electric power defined by the setting unit,
wherein the control unit computes an allowable operation amount of each mode permitted to the allowable consumed electric power of each mode, computes an operation amount log of each mode corresponding to the consumed-electric-power log related information of each mode, and stores the allowable operation amount of each mode and the operation amount log of each mode in the memory unit,
wherein the control unit computes an operation amount total log indicating a total of the operation amount logs of all the modes and stores the operation amount total log in the memory unit, and wherein the control unit controls the execution of the requested operation by the operation executing unit based on the operation amount total log and the allowable operation amount of each mode.

2. The information processing device according to claim 1, wherein, when the operation request is received within the consumption period, the control unit computes a predicted power consumption within the consumption period based on the consumed-electric-power log related information stored in the memory unit, and controls the execution of the requested operation by the operation executing unit by comparing the predicted power consumption and the allowable consumed electric power.

3. An information processing device comprising:
an operation executing unit to execute a requested operation in one of a plurality of operating modes;
a monitoring unit to monitor an electric power consumed by the execution of the requested operation by the operation executing unit;
a memory unit to store information related to the consumed electric power;
a setting unit to define a consumption period and an allowable consumed electric power within the consumption period; and
a control unit to compute a consumed-electric-power log of the consumed electric power monitored by the monitoring unit at intervals of a predetermined time and a consumed-electric-power total log indicating a total of the consumed-electric-power logs, and store consumed-electric-power log related information, including the consumed-electric-power logs and the consumed-electric-power total log, in the memory unit,
wherein, when an operation request is received within the consumption period, the control unit controls the execution of the requested operation by the operation executing unit based on the consumed-electric-power log related information stored in the memory unit and the allowable consumed electric power defined by the setting unit,
wherein the control unit stores past consumed-electric-power log related information, indicating consumed-electric-power log related information in past consumption periods, in the memory unit,
wherein, when the operation request is received at a specified period of the consumption period, the control unit computes a predicted power consumption within the consumption period based on the consumed-electric-power log related information stored in the memory unit by the specified period of the consumption period and the past consumed-electric-power log related information stored in the memory unit, and
wherein the control unit controls the execution of the requested operation by the operation executing unit by comparing the predicted power consumption and the allowable consumed electric power.

4. The information processing device according to claim 3, wherein the control unit computes an average of the past consumed-electric-power log related information and stores the average of the past consumed-electric-power log related information in the memory unit,
wherein, when the operation request is received at a specified period of the consumption period, the control unit computes a predicted power consumption within the consumption period based on the consumed-electric-power log related information stored in the memory unit by the specified period of the consumption period and the average of the past consumed-electric-power log related information stored in the memory unit, and
wherein the control unit controls the execution of the requested operation by the operation executing unit by comparing the predicted power consumption and the allowable consumed electric power.

5. The information processing device according to claim 1, further comprising a notification unit to output a notification indicating refusal of the operation request, wherein, when the execution of the requested operation is determined to be not allowable, the control unit causes the notification unit to output the notification.

6. The information processing device according to claim 5, wherein, when the execution of the requested operation is determined to be not allowable, the control unit searches an alternative operation for the requested operation and causes the notification unit to output a notification including the refusal of the operation request and presentation of the alternative operation to a requesting user.

7. The information processing device according to claim 1, wherein the information processing device includes a plurality of power saving modes with different consumed electric powers which are consumed when the information processing device shifts from a standby mode to a power saving mode and returns to the standby mode again, and
the control unit changes the power saving mode to a selected one of the plurality of power saving modes based on a difference between a predicted power consumption and the allowable consumed electric power.

8. The information processing device according to claim 1, wherein the information processing device includes a plurality of power saving modes with different consumed electric powers which are consumed when the information processing device shifts from a standby mode to a power saving mode and returns to the standby mode again, and
the control unit determines a tendency of the consumed electric power in the consumption period based on past power consumption log related information and the consumed electric power in the consumption period, and changes the power saving mode to a selected one of the plurality of power saving modes based on the tendency of the consumed electric power.

9. A network system in which a plurality of network devices and a power saving control device are connected to a network, each network device executing a requested operation in one of a plurality of operating modes respectively, each network device comprising:
a monitoring unit to monitor an electric power consumed by the execution of the requested operation; and
a consumed-electric-power providing unit to provide the consumed electric power monitored by the monitoring unit, to the power saving control device,
the power saving control device comprising:
a memory unit to store information related to the consumed electric power;
a setting unit to define a consumption period and an allowable consumed electric power within the consumption period; and
a control unit to compute a consumed-electric-power log of the consumed electric power monitored by the monitoring unit at intervals of a predetermined time and a consumed-electric-power total log indicating a total of the consumed-electric-power logs, and store consumed-electric-power log related information, including the consumed-electric-power logs and the consumed-electric-power total log, in the memory unit, wherein, when an operation request to one of the network devices is received within the consumption period, the control unit controls the execution of the requested operation by the operation executing unit based on the consumed-electric-power log related information stored in the memory unit and the allowable consumed electric power defined by the setting unit, wherein the control unit stores past consumed-electric-power log related information, indicating consumed-electric-power log related information in past consumption periods, in the memory unit, wherein, when the operation request is received at a specified period of the consumption period, the control unit computes a predicted power consumption within the consumption period based on the consumed-electric-power log related information stored in the memory unit by the specified period of the consumption period and the past consumed-electric-power log related information stored in the memory unit, and wherein the control unit controls the execution of the requested operation by the operation executing unit by comparing the predicted power consumption and the allowable consumed electric power.

10. The network system according to claim 9, wherein, when the operation request is received within the consumption period, the control unit computes a predicted power consumption within the consumption period based on the consumed-electric-power log related information stored in the memory unit, and controls the execution of the requested operation by the operation executing unit by comparing the predicted power consumption and the allowable consumed electric power.

11. The network system according to claim 9, wherein the control unit computes an average of the past consumed-electric-power log related information and stores the average of the past consumed-electric-power log related information in the memory unit, wherein, when the operation request is received at a specified period of the consumption period, the control unit computes a predicted power consumption within the consumption period based on the consumed-electric-power log related information stored in the memory unit by the specified period of the consumption period and the average of the past consumed-electric-power log related information stored in the memory unit, and wherein the control unit controls the execution of the requested operation by the operation executing unit by comparing the predicted power consumption and the allowable consumed electric power.

12. The network system according to claim 9, wherein the power saving control device further comprises a notification unit to output a notification indicating refusal of the operation request, wherein, when the execution of the requested operation is determined to be not allowable, the control unit searches an alternative network device for the requested operation among the plurality of network devices connected to the network and causes the notification unit to output a notification including the refusal of the operation request and presentation of the alternative network device to a requesting user.

13. The network system according to claim 9, wherein each network device includes a plurality of power saving modes with different consumed electric powers which are consumed when the network device shifts from a standby mode to a power saving mode and returns to the standby mode again, and wherein the control unit changes the power saving mode to a selected one of the plurality of power saving modes based on a difference between a predicted power consumption and the allowable consumed electric power.

* * * * *